(12) United States Patent
Sambonsugi et al.

(10) Patent No.: US 9,473,688 B2
(45) Date of Patent: Oct. 18, 2016

(54) IMAGE PICKUP APPARATUS COMPRISING A PLURALITY OF IMAGING SENSORS AND IMAGE PROCESSING UNITS

(71) Applicant: CANON KABUSHIKI KAISHA, Tokyo (JP)

(72) Inventors: Hideaki Sambonsugi, Tokyo (JP); Kento Inai, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/107,649

(22) Filed: Dec. 16, 2013

(65) Prior Publication Data

US 2014/0176785 A1 Jun. 26, 2014

(30) Foreign Application Priority Data

Dec. 20, 2012 (JP) .................................. 2012-277813
May 28, 2013 (JP) .................................. 2013-111591

(51) Int. Cl.
*H04N 5/232* (2006.01)
*H04N 5/225* (2006.01)

(52) U.S. Cl.
CPC ........ *H04N 5/23212* (2013.01); *H04N 5/2258* (2013.01); *H04N 5/23245* (2013.01)

(58) Field of Classification Search
CPC .................................................. H04N 5/2258
USPC ........................................................ 348/350
See application file for complete search history.

(56) References Cited

U.S. PATENT DOCUMENTS 6,819,360 B1 * 11/2004 Ide .................... H01L 27/14627
257/E27.131
7,751,700 B2 * 7/2010 Kusaka ........................... 396/79
(Continued)

FOREIGN PATENT DOCUMENTS

CN 101124504 A 2/2008
JP 58-024105 A 2/1983
(Continued)

OTHER PUBLICATIONS

The above references were cited in a Great Britain Search Report issued on Jun. 19, 2014, that issued in the corresponding Great Britain Patent Application No. 1322499.3.

(Continued)

*Primary Examiner* — Albert Cutler
(74) *Attorney, Agent, or Firm* — Cowan, Liebowitz & Latman, P.C.

(57) ABSTRACT

The image pickup apparatus includes: a first imaging sensor in which pixels including photoelectric conversion units are arranged two-dimensionally; a second imaging sensor in which pixels including photoelectric conversion units are arranged two-dimensionally, each pixel including one micro lens, and a first and a second photoelectric conversion units; a light beam splitting unit for splitting a flux of light entering an optical system into fluxes of light entering the first and the second imaging sensors separately; a first image processing unit for processing signals from the first imaging sensor, the first image processing unit generating a still image based on signals from the first imaging sensor; and a second image processing unit for processing signals from the second imaging sensor, the second image processing unit generating signals usable for focal point detection of a phase difference method and generating a moving image based on signals from the second imaging sensor.

20 Claims, 28 Drawing Sheets

(56) References Cited

U.S. PATENT DOCUMENTS

| | | | |
|---|---|---|---|
| 8,289,377 B1 * | 10/2012 | Tsai et al. | 348/47 |
| 2002/0030749 A1 | 3/2002 | Nakamura et al. | |
| 2012/0224096 A1 * | 9/2012 | Shimoda et al. | 348/349 |
| 2013/0120644 A1 | 5/2013 | Fujii | |

FOREIGN PATENT DOCUMENTS

| | | |
|---|---|---|
| JP | 04-345279 A | 12/1992 |
| JP | 2006-197406 A | 7/2006 |
| JP | 2007-065330 A | 3/2007 |
| JP | 2007-072254 A | 3/2007 |
| JP | 2007-097033 A | 4/2007 |
| JP | 2008-177903 A | 7/2008 |
| JP | 2008-211631 A | 9/2008 |
| JP | 2012-043939 A | 3/2012 |
| JP | 2012-182332 A | 9/2012 |
| WO | 2012023355 | 2/2012 |

OTHER PUBLICATIONS

Chinese Office Action, that issued in Chinese Patent Application No. 201310713586.1.

Japanese Office Action, issued in Japanese Patent Application No. 2012277813.

* cited by examiner

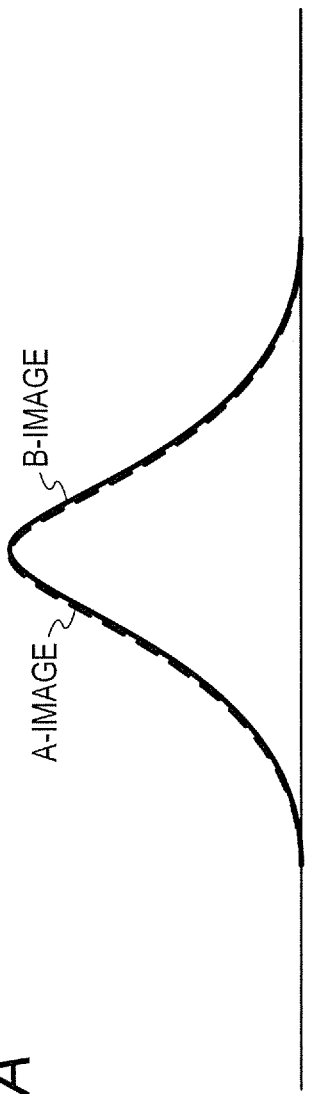
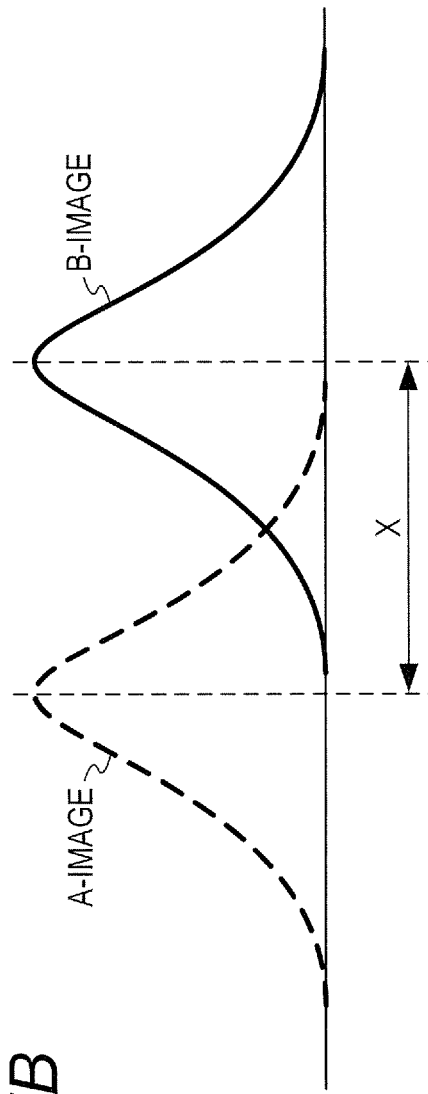
FIG. 7A
FIG. 7B 300c 300b 300a 303c 303b 303a 10100h 10100g 10100f 10103g 10103f

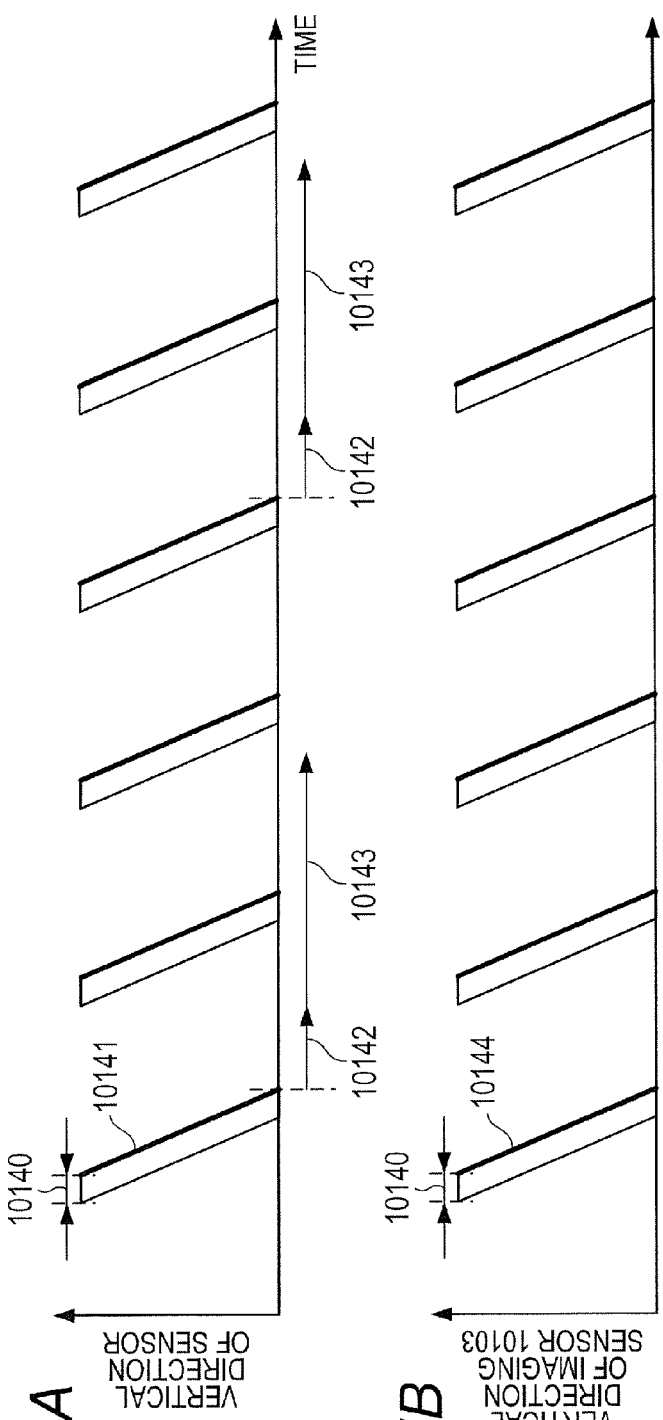

10200h 10200g 10200f 10203h 10203g 10203f

IMAGE PICKUP APPARATUS COMPRISING A PLURALITY OF IMAGING SENSORS AND IMAGE PROCESSING UNITS

BACKGROUND OF THE INVENTION

1. Field of the Invention

The present invention relates to auto-focusing and shooting a still image while shooting a moving image on an image pickup apparatus, and more particularly, to an image pickup apparatus that includes multiple imaging sensors.

2. Description of the Related Art

There has hitherto been known a technology of performing phase difference autofocus (AF) during the shooting of a moving image with the use of an imaging sensor for image shooting and an AF sensor for phase difference AF. Japanese Patent Application Laid-Open No. 2006-197406 discloses a technology of performing phase difference AF while displaying a moving image shot with an imaging sensor by using a half mirror so that a subject image enters the imaging sensor and an AF sensor.

The technology disclosed in Japanese Patent Application Laid-Open No. 2006-197406, however, requires stopping the moving image to shoot a still image and resuming the moving image after the shooting of the still image is finished. In addition, using an imaging sensor that outputs a still image and a moving image concurrently increases the processing time and the circuit configuration size. The present invention therefore provides an image pickup apparatus capable of focusing by AF during the shooting of a moving image and shooting a still image without stopping the shooting of the moving image.

SUMMARY OF THE INVENTION

An image pickup apparatus according to one embodiment of the present invention has the following configuration. Specifically, the image pickup apparatus includes: a first imaging sensor including pixels each having at least one photoelectric conversion unit and arranged in a two-dimensional array; a second imaging sensor including pixels arranged in a two-dimensional array, each of the pixels of the second imaging sensor having one micro lens, a first photoelectric conversion unit, and a second photoelectric conversion unit; a light beam splitting unit for splitting a flux of light entering an optical system into first and second fluxes of light to be applied to the first imaging sensor and the second imaging sensor respectively; a first image processing unit for processing signals from the pixels of the first imaging sensor, the first image processing unit generating a still image for recording based on signals from the first imaging sensor; and a second image processing unit for processing signals from the pixels of the second imaging sensor, the second image processing unit generating, based on signals from the first and second photoelectric conversion units of the second imaging sensor, signals that are usable for focal point detection of a phase difference method, and for generating a moving image for recording.

Further features of the present invention will become apparent from the following description of embodiments with reference to the attached drawings.

BRIEF DESCRIPTION OF THE DRAWINGS

FIGS. 7A and 7B illustrate the concept of focal point detection in the first embodiment of the present invention.

FIGS. 25A, 25B, and 25C are diagrams illustrating readout timing of the imaging sensors according to the fourth embodiment of the present invention.

DESCRIPTION OF THE EMBODIMENTS

In an image pickup apparatus of one embodiment of the present invention, a first imaging sensor which includes pixels and a second imaging sensor which includes focal point detection-use pixels are arranged so that images are formed by a shared image-forming optical system, and a signal from the pixel of the first imaging sensor and a signal from the pixel of the second imaging sensor are processed independently of each other by image processing units. This enables the image pickup apparatus to perform an AF operation in parallel to shooting by, for example, arranging multiple imaging sensors along with a light beam splitting unit so that the imaging sensors have the same imaging surface magnification, shooting a still image with one of the imaging sensors and a moving image with another of the imaging sensors independently of each other, and conducting focal point detection with the use of an output from the imaging sensor that outputs a moving image. The image pickup apparatus is thus capable of auto-focusing during the shooting of a moving image and shooting a still image without stopping the shooting of the moving image.

Embodiments of the present invention are described in detail below with reference to the accompanying drawings.

First Embodiment

Figure 1:
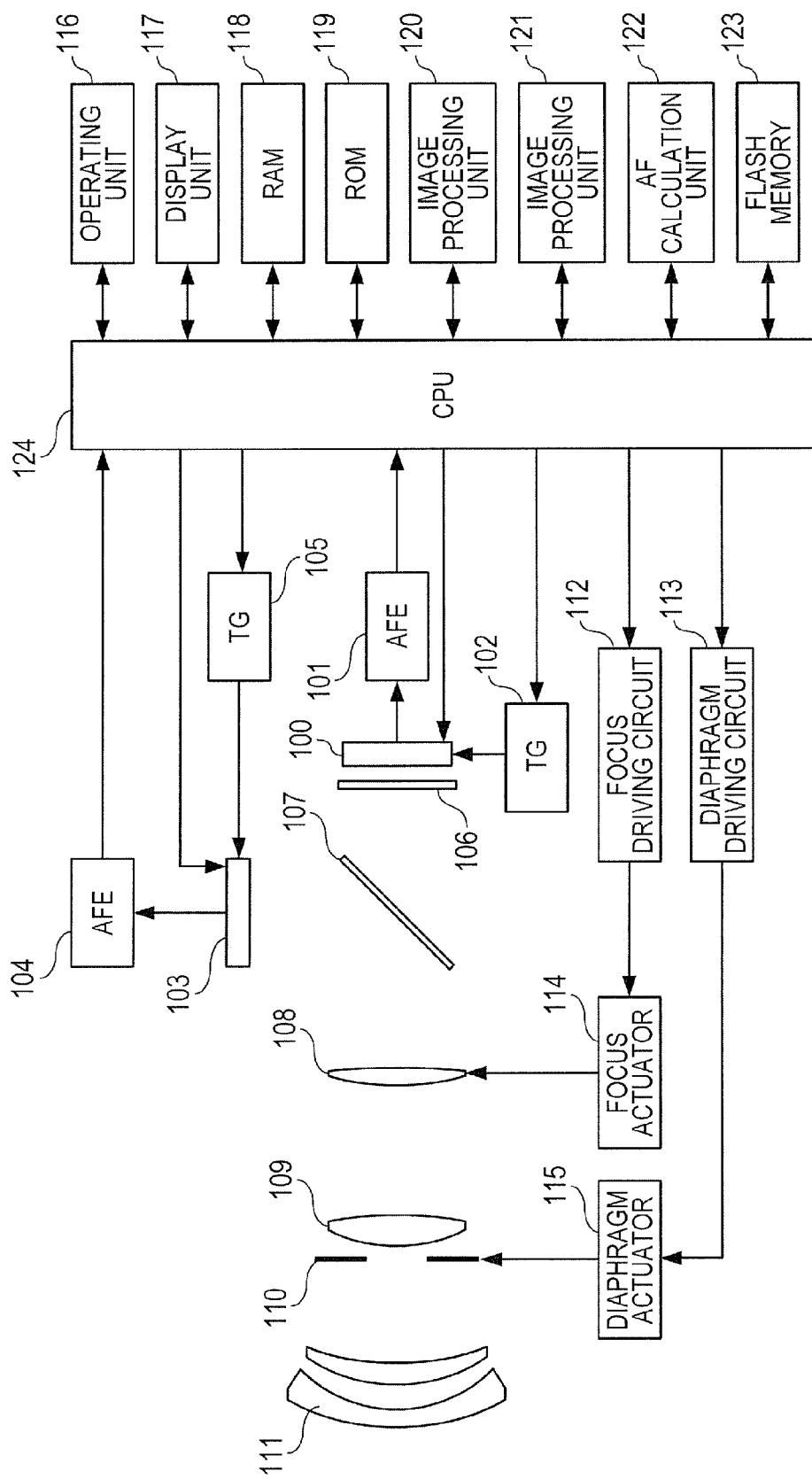
FIG. 1 illustrates the configuration of an image pickup apparatus according to a first embodiment of the present invention.

FIG. 1 is a block diagram illustrating the configuration of an image pickup apparatus according to a first embodiment of the present invention. The configuration and operation of the image pickup apparatus according to the first embodiment of the present invention are described with reference to FIG. 1. The image pickup apparatus of FIG. 1 has the following configuration. A first imaging sensor 100 converts an optical image into electrical signals. The imaging sensor 100 is used to shoot mainly a still image. An analog front end (hereinafter abbreviated as AFE) 101 performs digital conversion on an analog image signal output from the imaging sensor 100 in a manner determined by gain adjustment or a predetermined quantization bit. A timing generator (hereinafter abbreviated as TG) 102 controls the driving timing of the imaging sensor 100 and the AFE 101. A second imaging sensor 103 converts an optical image into electrical signals. The imaging sensor 103 is used to shoot mainly a moving image. An AFE 104 performs digital conversion on an analog image signal output from the imaging sensor 103 in a manner determined by gain adjustment or a predetermined quantization bit. A TG 105 controls the driving timing of the imaging sensor 103 and the AFE 104. While this embodiment uses the AFE 101 and the TG 102 which are associated with the first imaging sensor 100 and the AFE 104 and the TG 105 which are associated with the second imaging sensor 103, a configuration in which an AFE and a TG are built in each imaging sensor may be employed instead.

A random access memory (RAM) 118 has a double function of an image data storing unit, which stores image data that has been converted through digital conversion by the AFE 101 or the AFE 104 and image data that has been processed by an image processing unit 120 or 121 described later, and a work memory, which is used when a central processing unit (CPU) 124 described later operates. These functions, though implemented via the RAM 118 in this embodiment, may be implemented via another memory as long as the memory has a high enough access speed to cause no problems. A read-only memory (ROM) 119 stores a program that is used when the CPU 124 operates. The ROM 119 in this embodiment is a flash ROM, which is merely an example. Another memory can be employed as the ROM 119 as long as the memory has a high enough access speed to cause no problems. The CPU 124 exerts overall control on the image pickup apparatus. The image processing unit 120 performs processing such as correction and compression on a shot still image which is described later. The image processing unit 121 performs processing such as correction and compression on a shot moving image which is described later. The image processing unit 121 also has a function of adding A-image data and B-image data which are described later. In this manner, a signal from a pixel of the first imaging sensor and a signal from a pixel of the second imaging sensor are processed independently of each other by image processing units to generate images.

An AF calculation unit 122 conducts focal point detection based on a pixel signal output from the second imaging sensor 103. A detachable flash memory 123 records still image data and moving image data. The recording medium which is a flash memory in this embodiment may be other data writable media such as a non-volatile memory and a hard disk. These recording media may also be in a built-in format. An operating unit 116 issues a shooting command and sets shooting conditions or other conditions to the CPU 124. A display unit 117 displays a still image and a moving image that have been shot, a menu, and the like.

A first lens unit 111 placed at the front end of an imaging optical system (shared optical system) is held in a manner that allows the first lens unit 111 to move forward and backward in an optical axis direction. A diaphragm 110 adjusts the amount of light at the time of shooting by adjusting the diameter of its aperture. A second lens unit 109 moves forward and backward in the optical axis direction as one with the diaphragm 110, and exerts a variable magnification action (zoom function) in conjunction with the forward/backward movement of the first lens unit 111. A third lens unit 108 moves forward and backward in the optical axis direction, to thereby adjust the focal point. A half mirror 107 splits an incident flux of light from a subject into reflected light and transmitted light. Light reflected by the half mirror 107 enters the second imaging sensor 103 and light transmitted through the half mirror 107 enters the first imaging sensor 100.

A focal plane shutter 106 adjusts the exposure time in a fraction of a second when shooting a still image. While this embodiment uses a focal plane shutter to adjust the exposure time in a fraction of a second for the imaging sensor 100, the present invention is not limited thereto. The imaging sensor 100 may have an electronic shutter function to adjust the exposure time in a fraction of a second with a control pulse. A focus driving circuit 112 is a focal point changing unit for changing the position of the focal point of the optical system. The focus driving circuit 112 adjusts the focal point by driving and controlling a focus actuator 114 based on a focal point detection result of the AF calculation unit 122, and driving the third lens unit 108 forward and backward in the optical axis direction. A diaphragm driving circuit 113 drives and controls a diaphragm actuator 115 to control the aperture of the diaphragm 110.

Figure 2:
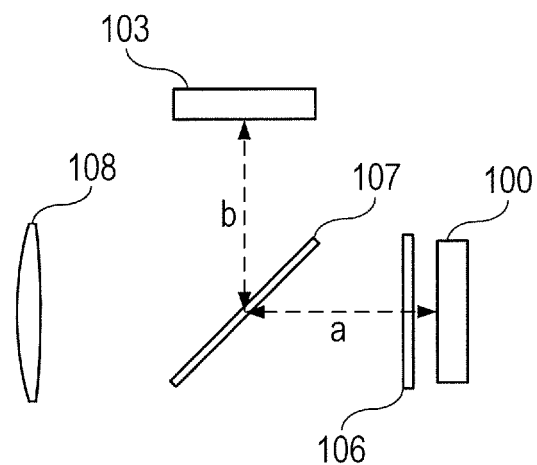
FIG. 2 illustrates the configuration of the image pickup apparatus according to the first embodiment of the present invention.

FIG. 2 is a diagram illustrating the positions of the first imaging sensor 100, the second imaging sensor 103, and the half mirror 107. As described above, the half mirror 107 is disposed at a position and an angle that cause light reflected by the half mirror 107 to enter the imaging sensor 103 and light transmitted through the half mirror 107 to enter the imaging sensor 100. In other words, light entering the first imaging sensor 100 is one that has been transmitted through the light beam splitting unit and light entering the second imaging sensor 103 is one that has been reflected by the light beam splitting unit. A distance a from the center of the half mirror 107 to the imaging sensor 100 is equal to a distance b from the center of the half mirror 107 to the imaging sensor 103. Primary formed images which are subject images with an equal magnification thus enter the first imaging sensor 100 and the second imaging sensor 103. This configuration ensures that an image formed on the first imaging sensor 100 is in focus even when the AF operation is performed with the use of an image signal of the second imaging sensor 103.

Figure 3:
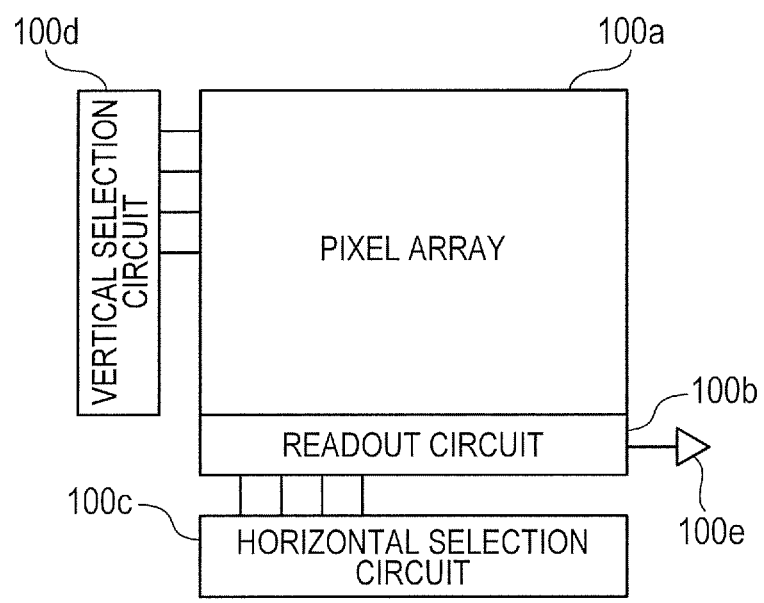
FIG. 3 illustrates the configuration of an imaging sensor in the first embodiment of the present invention.

The first imaging sensor 100 is described next. FIG. 3 illustrates the configuration of the imaging sensor 100. The imaging sensor in FIG. 3 includes a pixel array 100a, a vertical selection circuit 100d for selecting a row in the pixel array 100a, and a horizontal selection circuit 100c for selecting a column in the pixel array 100a. The imaging sensor also includes a readout circuit 100b for reading signals of pixels that are selected by the vertical selection circuit 100d and the horizontal selection circuit 100c out of the pixels in the pixel array 100a. The vertical selection circuit 100d selects a row of the pixel array 100a and, in the selected row, activates a readout pulse which is output from the TG 102 based on a horizontal synchronization signal output from the CPU 124. The readout circuit 100b includes an amplifier and a memory for each column, and stores pixel signals of a selected row in the memory via the amplifier. One row of pixel signals stored in the memory are selected one by one in the column direction by the horizontal selection circuit 100c to be output to the outside via an amplifier 100e. This operation is repeated as many times as the number of rows until all pixel signals are output to the outside.

Figure 4A:
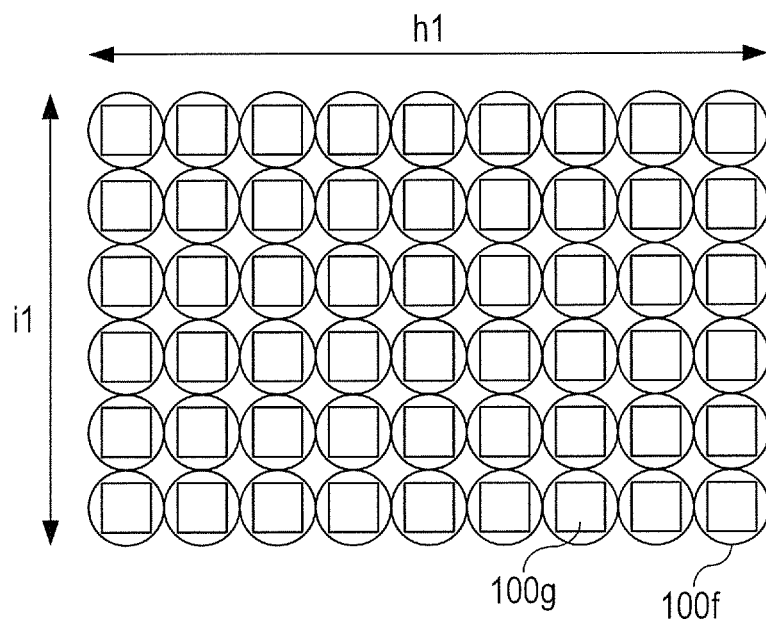
FIGS. 4A and 4B illustrate the configurations of imaging sensors in the first embodiment of the present invention.

FIG. 4A illustrates the configuration of the pixel array 100a. The pixel array 100a of the first imaging sensor 100 is made up of multiple pixels arranged in a two-dimensional array pattern in order to provide a two-dimensional image. The pixel array 100a of the first imaging sensor 100 in FIG. 4A includes micro lenses 100f and photodiodes (PDs) 100g for performing photoelectric conversion. Each pixel has one micro lens 100f for one PD 100g, with the micro lens 100f placed above the PD 100g. The thus configured pixels are arranged so that there are h1 pixels in the horizontal direction and i1 pixels in the vertical direction.

Figure 4B:
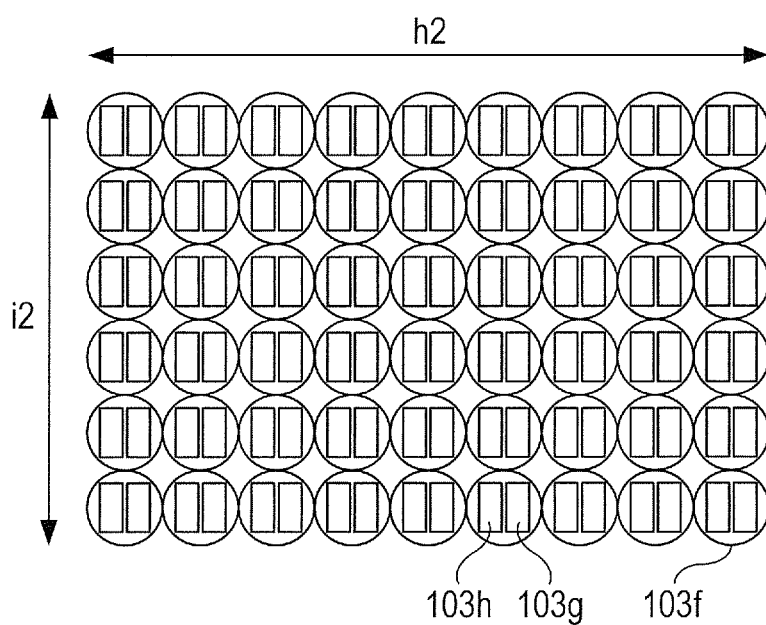

The configuration and reading operation of the second imaging sensor 103 are the same as those of the first imaging sensor 100 illustrated in FIG. 3, and descriptions thereof are omitted. The pixel array of the second imaging sensor 103 is illustrated in FIG. 4B. The pixel array of the second imaging sensor 103 in FIG. 4B includes micro lenses 103f, PDs 103g, and PDs 103h. Each pixel has one micro lens 103f for two PDs, with the micro lens 103f placed above the PDs.

In other words, each focal detection-use pixel has multiple photoelectric conversion units for one micro lens. When an area where one micro lens 103f is shared constitutes one pixel, the thus configured pixels are arranged so that there are h2 pixels in the horizontal direction and i2 pixels in the vertical direction. Signals accumulated in the PDs 103g and signals accumulated in the PDs 103h are separately output to the outside by the reading operation described above. A configuration described later causes separate images having a phase difference to enter the PD 103g and PD 103h. Here, the PDs 103g are therefore referred to as A-image photoelectric conversion units whereas the PDs 103h are referred to as B-image photoelectric conversion units. The second imaging sensor is not limited to the configuration of this embodiment in which two PDs are provided for one micro lens. The second imaging sensor can employ any configuration in which multiple PDs are provided for one micro lens with the PDs placed longitudinally or transversally.

Figure 5A:
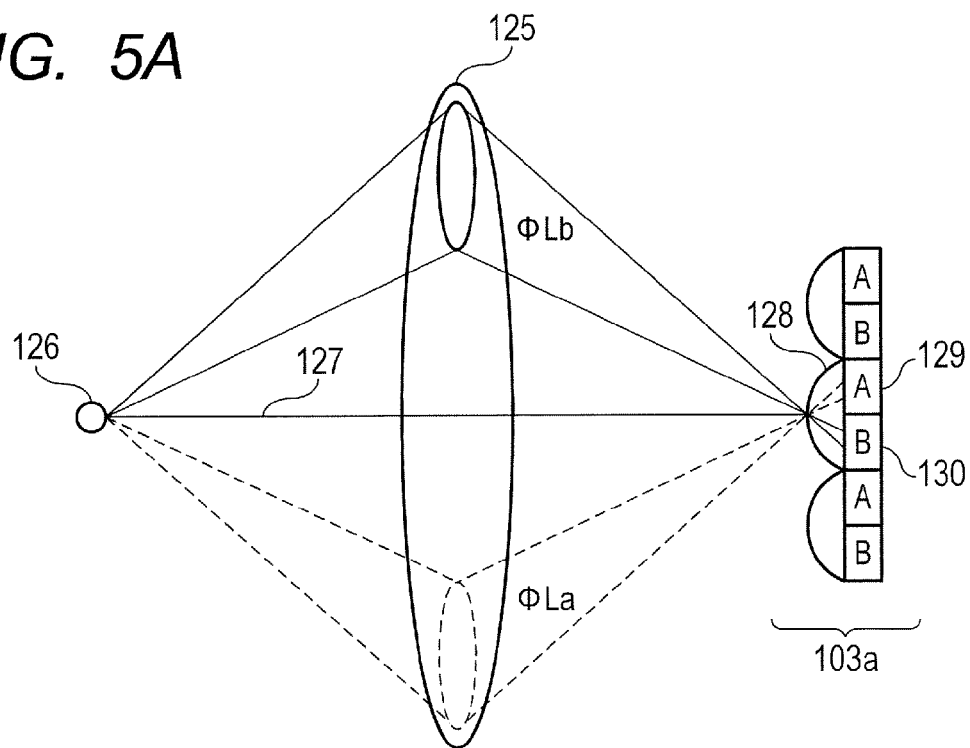
FIGS. 5A and 5B illustrate the concept of focal point detection in the first embodiment of the present invention.
Figure 5B:
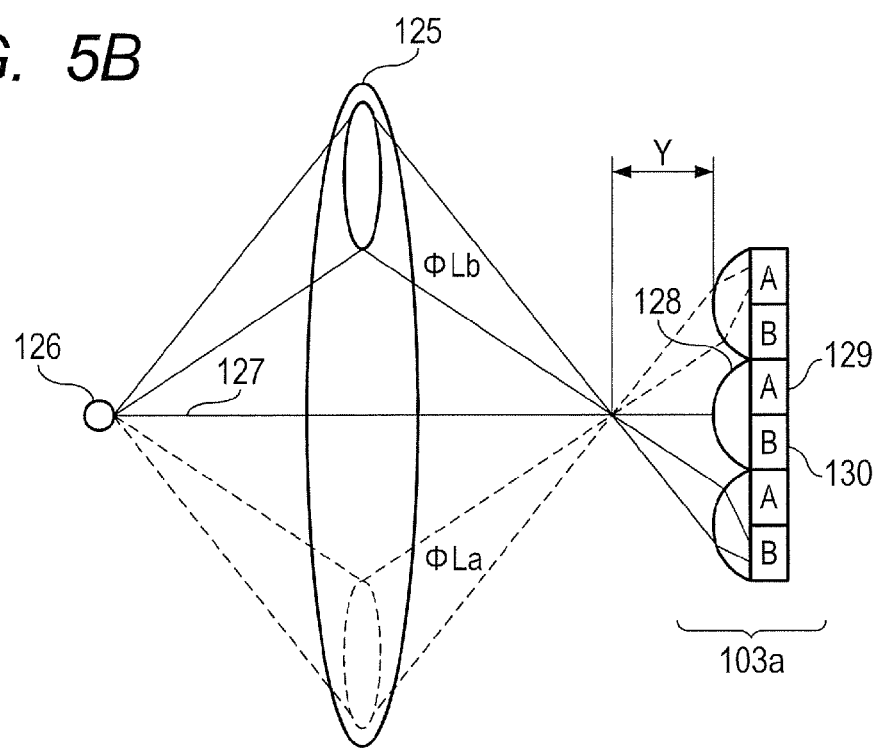

Described next are pieces of image data output by the A-image photoelectric conversion unit and B-image photoelectric conversion unit of the second imaging sensor 103. FIGS. 5A and 5B are diagrams illustrating the relation between a focus state and a phase difference in the imaging sensor 103. FIGS. 5A and 5B illustrate a pixel array cross-section 103a, the micro lenses described above, which are denoted here by 128, the A-image photoelectric conversion units, which are denoted here by 129, and the B-image photoelectric conversion units, which are denoted here by 130. A shooting lens 125 is an imaging optical system in which an aggregation of the first lens unit 111, second lens unit 109, and third lens unit 108 of FIG. 1 is treated as one shooting lens. Light from a subject 126 passes areas of the shooting lens 125 about an optical axis 127, and forms an image on the imaging sensor. Here, the centers, namely the centers of gravity, of the exit pupil and the shooting lens coincide with each other.

With this configuration, viewing the imaging optical system from the A-image photoelectric conversion units and viewing the imaging optical system from the B-image photoelectric conversion units are equivalent to dividing the pupil of the imaging optical system symmetrically with respect to the center. In other words, a flux of light from the imaging optical system is split into two fluxes of light by what is called pupil division. The split fluxes of light (a first flux of light and a second flux of light) enter the A-image photoelectric conversion unit and the B-image photoelectric conversion unit which are first photoelectric conversion unit and second photoelectric conversion unit for respectively receiving fluxes of light that have been created by pupil division. The first flux of light is a light flux created by pupil division in a first area of the exit pupil, and the second flux of light is a light flux created by pupil division in a second area of the exit pupil which is off from the first area. In this manner, a flux of light from a specific point on the subject 126 is split into a light flux ΦLa, which passes through a fraction of the pupil that corresponds to the A-image photoelectric conversion unit and enters the A-image photoelectric conversion unit, and a light flux ΦLb, which passes through a fraction of the pupil that corresponds to the B-image photoelectric conversion unit and enters the B-image photoelectric conversion unit.

These two fluxes of light, which enter from the same point on the subject 126, pass through the same micro lens and arrive at one point on the imaging sensor as illustrated in FIG. 5A when the imaging optical system is in focus. An image signal obtained by the A-image photoelectric conversion unit 129 and an image signal obtained by the B-image photoelectric conversion unit 130 therefore match. When the imaging optical system is out of focus by Y as illustrated in FIG. 5B, on the other hand, a point at which the light flux ΦLa arrives and a point at which the light flux ΦLb arrives are off from each other by an amount of change in the angle of incidence on the micro lens that is observed in the light fluxes ΦLa and ΦLb. A phase difference is consequently caused between an image signal obtained from the A-image photoelectric conversion unit 129 and an image signal obtained from the B-image photoelectric conversion unit 130. Two subject images (an A-image and a B-image) having a phase difference are respectively converted through photoelectric conversion by the A-image photoelectric conversion unit 129 and the B-image photoelectric conversion unit 130, separately output to the outside, and used in an AF operation, which is described later.

A pixel count h1*i1 of the first imaging sensor 100, which is for shooting a still image, is higher than a pixel count h2*i2 of the second imaging sensor 103, which is for shooting a moving image. In other words, the pixel count of the second imaging sensor is lower than the pixel count of the first imaging sensor. The imaging sensor 103 which is lower in pixel count than the imaging sensor 100 is larger in the planar dimensions of PDs and is accordingly higher in sensitivity. A flux of light is therefore split by the half mirror 107 so that the ratio of transmitted light and reflected light is M:N, and the ratio N of the reflected light entering the imaging sensor 103 which is higher in sensitivity is smaller than M. In other words, the intensity of a split flux of light which enters the second imaging sensor is lower than the intensity of a split flux of light that enters the first imaging sensor.

Figure 6:
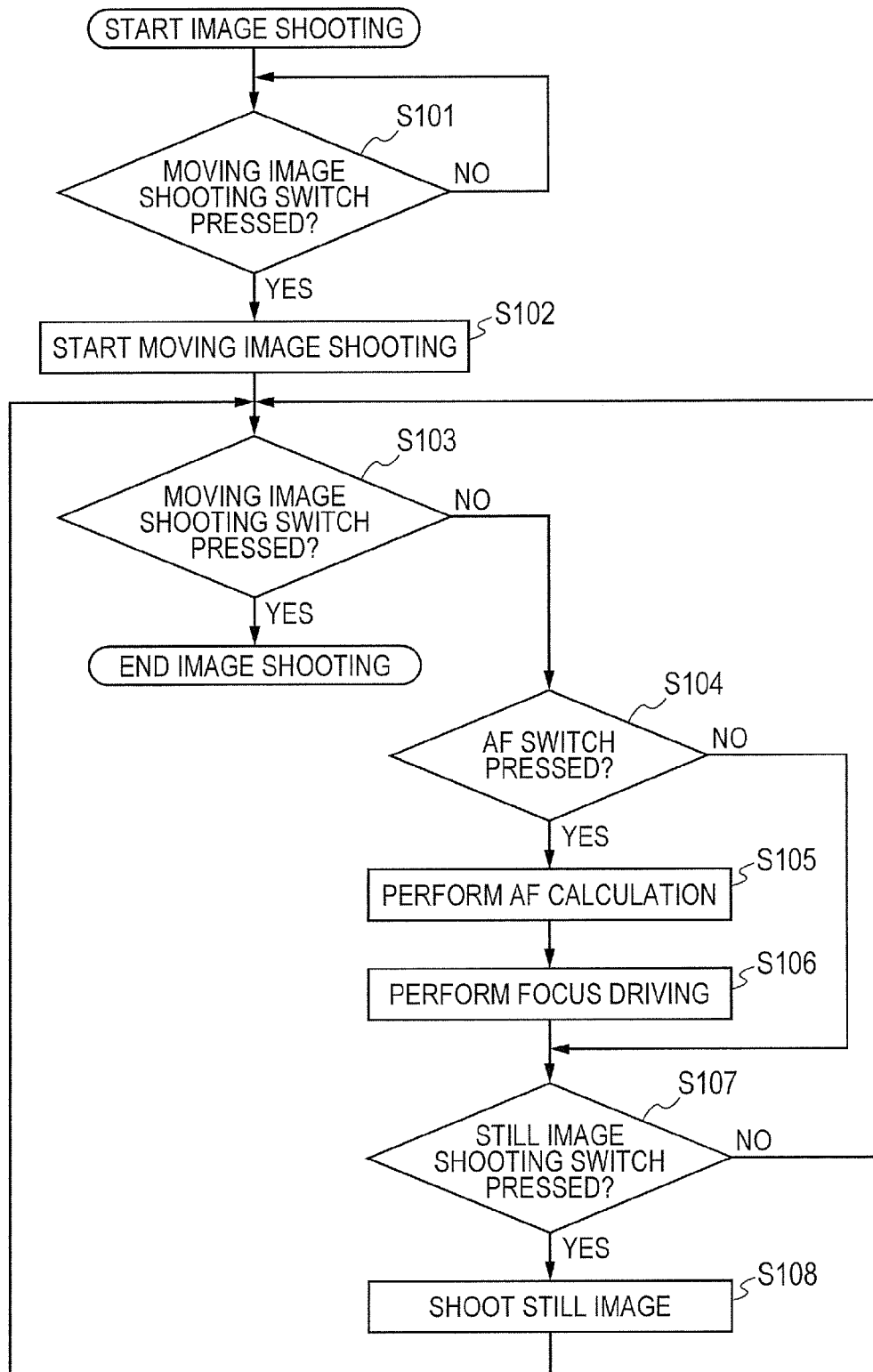
FIG. 6 is a flow chart illustrating the operation of the image pickup apparatus according to the first embodiment of the present invention.

The operation of the image pickup apparatus in this embodiment is described next with reference to a flow chart of FIG. 6. First, the image pickup apparatus stands by until a moving image shooting switch which is included in the operating unit 116 is pressed in a step S101. With the press of the moving image shooting switch, the shooting of a moving image is started in a step S102. When the shooting of a moving image begins, the second imaging sensor 103, the AFE 104, and the TG 105 are powered on and the CPU 124 sets moving image shooting settings. After the setting, the TG 105 outputs a readout pulse to the imaging sensor 103 based on a synchronization signal output from the CPU 124, and the imaging sensor 103 starts a reading operation at a predetermined frame rate. This embodiment uses an electronic shutter function by way of a slit rolling operation for the operation of accumulating and reading electric charges of a moving image, but the present invention is not limited thereto. The imaging sensor 103 outputs A-image photoelectric conversion unit data and B-image photoelectric conversion unit data, which are transferred to the RAM 118 by the CPU 124, and then to the image processing unit 121. In the image processing unit 121, pieces of data of the A-image photoelectric conversion unit and the B-image photoelectric conversion unit that are below the same micro lens are added for each pixel. A frame of the moving image is created in this manner. Thereafter, correction processing, compression, and the like are performed on the moving image, which is then displayed on the display unit 117 (live view). In the case where recording a moving image has been selected with the use of a menu displayed on the display unit 117 and the operating unit 116 prior to shooting, the moving image is sequentially recorded in the flash memory 123.

In a step S103, whether or not the moving image shooting switch has been pressed again is determined. In the case where the moving image shooting switch has not been pressed, the shooting of the moving image is continued and a step S104 is executed. The shooting of the moving image is ended when the moving image shooting switch is pressed.

In the next step which is the step S104, whether an AF switch which is included in the operating unit 116 has been pressed or not is determined. In the case where the AF switch has been pressed, AF calculation is performed in a step S105. In the step S105, the CPU 124 transfers A-image data, which is based on the A-image photoelectric conversion unit data stored in the RAM 118 and corresponds to the A-image, and B-image data, which is based on the B-image photoelectric conversion unit data stored in the RAM 118 and corresponds to the B-image, to the AF calculation unit 122.

FIG. 7A illustrates A-image data and B-image data in FIG. 5A where the optical system is in focus. The horizontal axis represents pixel position and the vertical axis represents output. The A-image data and the B-image data match when the optical system is in focus. FIG. 7B illustrates A-image data and B-image data in FIG. 5B where the optical system is out of focus. The A-image data and the B-image data in this case have a phase difference due to the situation described above, and the pixel position of the A-image data and the pixel position of the B-image data are off from each other by a shift amount X. The AF calculation unit 122 which is a focal point detecting unit calculates the shift amount X for each frame of a moving image, to thereby calculate an out-of-focus amount, i.e., the Y value in FIG. 5B. In other words, the focal point detecting unit performs focal point detection by a phase difference detection method with the use of an output of a focal point detection-use pixel of the second imaging sensor. The AF calculation unit 122 transfers the calculated Y value to the focus driving circuit 112.

In a step S106, the focus driving circuit 112 calculates how far the third lens unit 108 is to be moved based on the Y value obtained from the AF calculation unit 122, and outputs a drive command to the focus actuator 114. The third lens unit 108 is moved by the focus actuator 114 to a point where the imaging sensor 103 is in focus. Because primary formed images having the same imaging surface magnification enter the first imaging sensor 100 and the second imaging sensor 103 at this point and the depth of field and the like are the same as well, the imaging sensor 100, too, is in focus when the imaging sensor 103 is in focus.

Whether or not a still image shooting switch which is included in the operating unit 116 has been pressed is determined next in a step S107. In the case where the still image shooting switch has been pressed, a still image is shot in a step S108. As the shooting of a still image begins, the first imaging sensor 100, the AFE 101, and the TG 102 are powered on, and the CPU 124 sets still image shooting settings. After the setting, the CPU 124 operates the focal plane shutter 106 to perform an exposure operation on the imaging sensor 100. Thereafter, the TG 102 outputs a readout pulse to the imaging sensor 100 based on a synchronization signal output from the CPU 124, and the imaging sensor 100 starts a reading operation. Image data output from the imaging sensor 100 is converted into digital data by the AFE 101, and then stored in the RAM 118. The CPU 124 transfers the image data stored in the RAM 118 to the image processing unit 120, where correction processing, compression, and the like are performed on the image data. The image data is subsequently recorded in the flash memory 123. The processing then returns to the step S103 to repeat the operation of the steps S103 to S108.

In the case where it is found in the step S104 that the AF switch has not been pressed, the processing moves to the step S107 to determine whether or not the still image shooting switch has been pressed. The same applies to the case where the AF operation has been set to "off" via a displayed menu with the use of the display unit 117 and the operating unit 116.

The operation described above enables the image pickup apparatus to put an image entering the imaging sensor 103 or the imaging sensor 100 into focus by performing a phase difference AF operation while shooting a moving image (live view or moving image recording), and to shoot a still image at the same time.

All pixels of the second imaging sensor 103 allow for ranging and are used for phase difference AF in this embodiment. However, the second imaging sensor is not limited to this configuration. Pixels that allow for ranging may be arranged discretely and signals from the pixels may be used in phase difference AF. A pixel that allows for ranging in this case may have one PD below a micro lens, and pupil division may be performed with a light-shielding layer blocking light to the left or right, or the top or bottom of the PD. In other words, the second imaging sensor only needs to have focal point detection-use pixels each of which includes the first photoelectric conversion unit for receiving a flux of light that has been created by pupil division in the first area of the exit pupil, and/or the second photoelectric conversion unit for receiving a flux of light that has been created by pupil division in the second area of the exit pupil which is off from the first area. The imaging sensor may include image-use pixels and focal point detection-use pixels.

While the second imaging sensor 103 in this embodiment includes pixels that allow for ranging and that are used for phase difference AF, the present invention is not limited to this configuration. The second imaging sensor 103 may have the same pixel configuration as that of the first imaging sensor 100 in which one PD is provided below one micro lens, to employ contrast AF in which an AF operation is performed by detecting a contrast in a read moving image. In other words, the focal point detecting unit can detect a focal point also by a contrast detection method in which a contrast is detected from pixel outputs of the second imaging sensor. Focal point detection by the contrast detection method is of course executable also when two or more PDs are provided below one micro lens as in this embodiment.

In addition, the present invention is not limited to the moving image generation of this embodiment in which a moving image is generated by adding A-image data and B-image data of the imaging sensor 103 in the image processing unit. In the case where each of the A-image data and the B-image data is not necessary, for example, when focal point detection is not performed or is performed partially, A-image data and B-image data may be added within the imaging sensor for some of or all of the pixels before output. The present invention is also not limited to the operation mode described in this embodiment in which a still image is shot during the shooting of a moving image. The image pickup apparatus is also capable of shooting a still image when a moving image is not shot.

Second Embodiment

Figure 8:
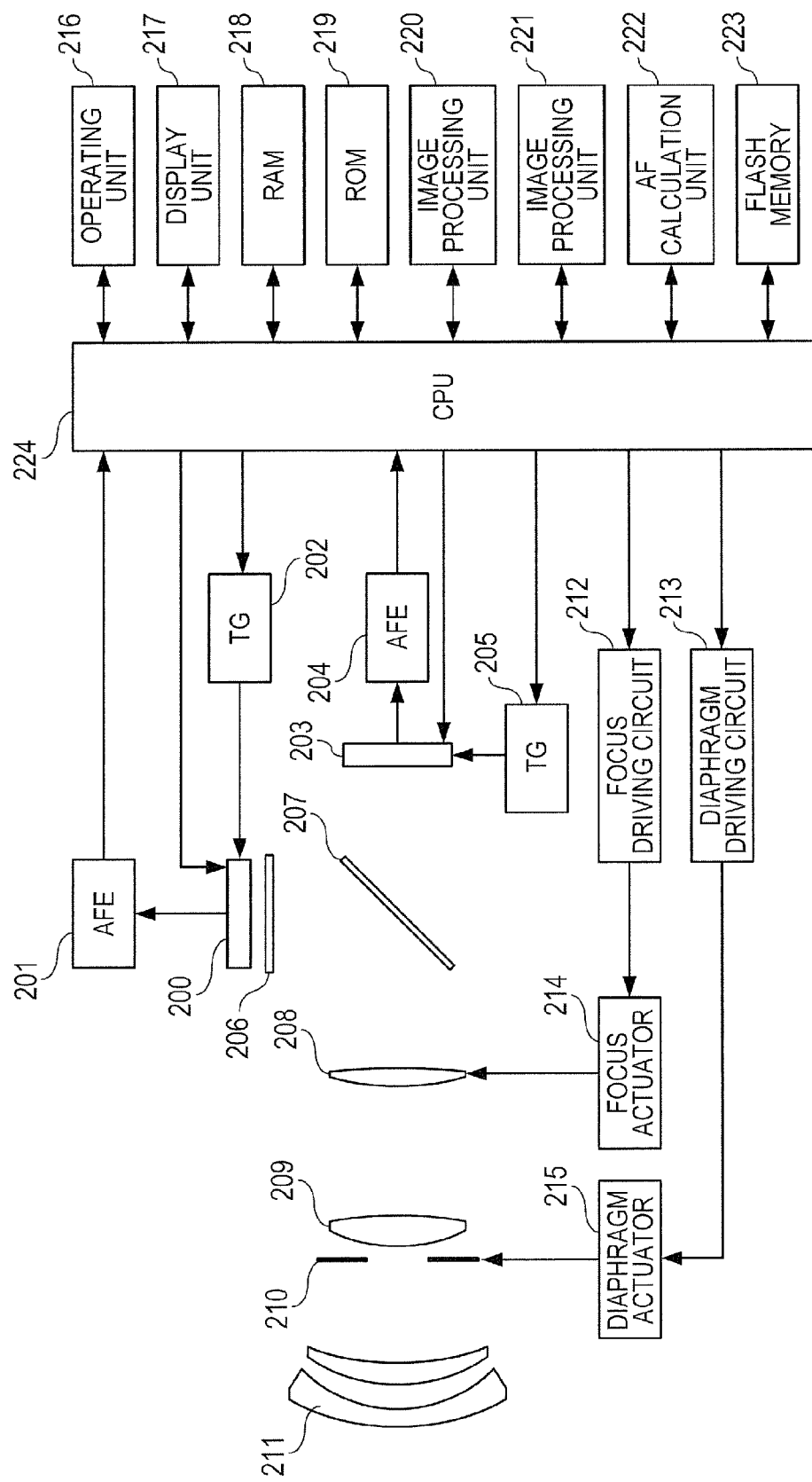
FIG. 8 illustrates the configuration of an image pickup apparatus according to a second embodiment of the present invention.

Now, the configuration and operation of an image pickup apparatus according to a second embodiment of the present invention are described with reference to FIG. 8. The image pickup apparatus of FIG. 8 has the following configuration. A first imaging sensor 200 converts an optical image into electrical signals. The imaging sensor 200 is used to shoot mainly a still image. An AFE 201 performs digital conversion on an analog image signal output from the imaging sensor 200 in a manner determined by gain adjustment or a predetermined quantization bit. A TG 202 controls the driving timing of the imaging sensor 200 and the AFE 201.

A second imaging sensor 203 converts an optical image into electrical signals. The imaging sensor 203 is used to shoot mainly a moving image. An AFE 204 performs digital conversion on an analog image signal output from the imaging sensor 203 in a manner determined by gain adjustment or a predetermined quantization bit. A TG 205 controls the driving timing of the imaging sensor 203 and the AFE 204. While this embodiment also uses the AFE 201 and the TG 202 which are associated with the first imaging sensor 200 and the AFE 204 and the TG 205 which are associated with the second imaging sensor 203, a configuration in which an AFE and a TG are built in each imaging sensor may be employed instead.

Components 206 to 224 correspond to the components 106 to 124 of the first embodiment, respectively. A difference is that light reflected by the half mirror 207, which splits an incident flux of light from a subject into reflected light and transmitted light, enters the first imaging sensor 200 whereas light transmitted through the half mirror 207 enters the second imaging sensor 203.

Figure 9:
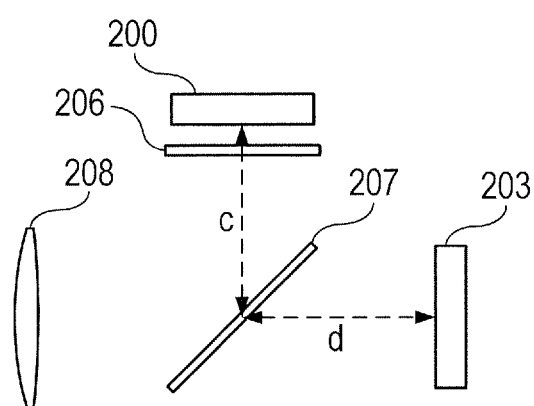
FIG. 9 illustrates the configuration of the image pickup apparatus according to the second embodiment of the present invention.

FIG. 9 is a diagram illustrating the positions of the first imaging sensor 200, the second imaging sensor 203, and the half mirror 207. An image transmitted through the half mirror tends to be unsharp due to an optical aberration of the half mirror. As described later, a still image which is shot with the imaging sensor 200 higher in pixel count than the imaging sensor 203 is requested to be a sharper image. The half mirror 207 in this embodiment is therefore disposed at a position and an angle that cause light reflected by the half mirror 207 to enter the imaging sensor 200 and light transmitted through the half mirror 207 to enter the imaging sensor 203 as described above. A distance c from the center of the half mirror 207 to the imaging sensor 200 is equal to a distance d from the center of the half mirror 207 to the imaging sensor 203. Primary formed images which are subject images with an equal magnification thus enter the first imaging sensor 200 and the second imaging sensor 203. This configuration ensures that an image formed on the first imaging sensor 200 is in focus even when an AF operation is performed with the use of an image signal of the second imaging sensor 203 described later.

The configuration and function of the first imaging sensor 200 and the second imaging sensor 203 are the same as the configuration and function described in the first embodiment, and descriptions thereof are omitted. In the configuration of the image pickup apparatus of this embodiment, where the imaging sensor 200 is used to shoot a still image and the imaging sensor 203 is used to shoot a moving image, a pixel count h1*i1 of the imaging sensor 200 is higher than a pixel count h2*i2 of the imaging sensor 203. The imaging sensor 203 which is lower in pixel count than the imaging sensor 200 is larger in the planar dimensions of PDs and is accordingly higher in sensitivity. A flux of light is split by the half mirror 207 so that the ratio of transmitted light and reflected light is M:N, and the ratio M of the transmitted light entering the imaging sensor 203 which is higher in sensitivity is smaller than N.

Figure 10:
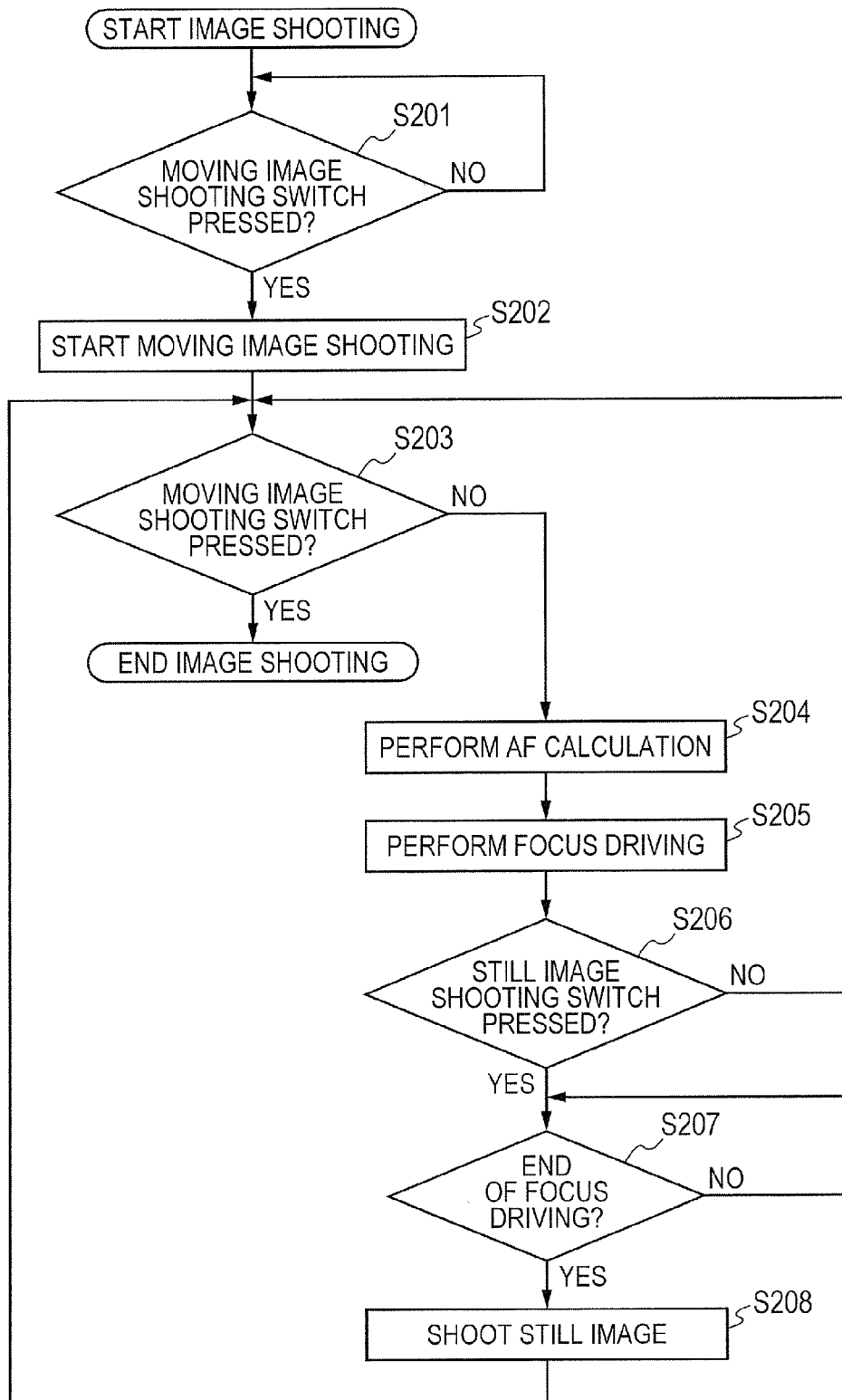
FIG. 10 is a flow chart illustrating the operation of the image pickup apparatus according to the second embodiment of the present invention.

The operation of the image pickup apparatus in this embodiment is described next with reference to a flow chart of FIG. 10. First, the image pickup apparatus stands by until a moving image shooting switch which is included in the operating unit 216 is pressed in a step S201. With the press of the moving image shooting switch, the shooting of a moving image is started in a step S202. When the shooting of a moving image begins, the imaging sensor 203, the AFE 204, and the TG 205 are powered on and the CPU 224 sets moving image shooting settings. After the setting, the TG 205 outputs a readout pulse to the imaging sensor 203 based on a synchronization signal output from the CPU 224, and the imaging sensor 203 starts a reading operation at a predetermined frame rate. This embodiment, too, uses an electronic shutter function by way of a slit rolling operation for the operation of accumulating and reading electric charges of a moving image. However, the present invention is not limited thereto.

The imaging sensor 203 outputs A-image photoelectric conversion unit data and B-image photoelectric conversion unit data, which are transferred to the RAM 218 by the CPU 224, and then to the image processing unit 221. In the image processing unit 221, pieces of data of the A-image photoelectric conversion unit and the B-image photoelectric conversion unit that are below the same micro lens are added for each pixel. A frame of the moving image is created in this manner. Thereafter, correction processing, compression, and the like are performed on the moving image, which is then displayed on the display unit 217 (live view). In the case where recording a moving image has been selected with the use of a menu displayed on the display unit 217 and the operating unit 216 prior to shooting, the moving image is sequentially recorded in the flash memory 223.

In a step S203, whether or not the moving image shooting switch has been pressed again is determined. In the case where the moving image shooting switch has not been pressed, the shooting of the moving image is continued and a step S204 is executed. The shooting of the moving image is ended when the moving image shooting switch is pressed. In the step S204, AF calculation is performed. The CPU 224 transfers A-image data, which is based on the A-image photoelectric conversion unit data stored in the RAM 218 and corresponds to an A-image, and B-image data, which is based on the B-image photoelectric conversion unit data stored in the RAM 218 and corresponds to a B-image, to the AF calculation unit 222. FIG. 7A illustrates A-image data and B-image data in FIG. 5A where the optical system is in focus. The horizontal axis represents pixel position and the vertical axis represents output. The A-image data and the B-image data match when the optical system is in focus. FIG. 7B illustrates A-image data and B-image data in FIG. 5B where the optical system is out of focus. The A-image data and the B-image data in this case have a phase difference due to the situation described above, and the pixel position of the A-image data and the pixel position of the B-image data are off from each other by a shift amount X. The AF calculation unit 222 calculates the shift amount X for each frame of a moving image, to thereby calculate an out-of-focus amount, i.e., the Y value in FIG. 5B. The AF calculation unit 222 transfers the calculated Y value to the focus driving circuit 212. In a step S205, the focus driving circuit 212 calculates how far the third lens unit 208 is to be moved based on the Y value obtained from the AF calculation unit 222, and outputs a drive command to the focus actuator 214. The third lens unit 208 is moved by the focus actuator 214 to a point where the imaging sensor 203 is in focus. Because primary formed images having the same imaging surface magnification enter the imaging sensor 200 and the imaging sensor 203 at this point and the depth of field and the like are the same as well, the imaging sensor 200, too, is in focus when the imaging sensor 203 is in focus.

Whether or not a still image shooting switch which is included in the operating unit 216 has been pressed is determined next in a step S206. In the case where the still image shooting switch has been pressed, the processing moves to a step S207. In the step S207, whether focus driving, namely, the moving of the third lens unit 208, has stopped or not is determined. In the case where the focus driving has not stopped, the image pickup apparatus waits until the third lens unit 208 comes to a stop. In the case where the focus driving has stopped, a still image is shot. When the shooting of a still image begins in a step S208, the imaging sensor 200, the AFE 201, and the TG 202 are powered on, and the CPU 224 sets still image shooting settings. After the setting, the CPU 224 operates the focal plane shutter 206 to perform an exposure operation on the imaging sensor 200. Thereafter, the TG 202 outputs a readout pulse to the imaging sensor 200 based on a synchronization signal output from the CPU 224, and the imaging sensor 200 starts a reading operation. Image data output from the imaging sensor 200 is converted into digital data by the AFE 201, and then stored in the RAM 218. The CPU 224 transfers the image data stored in the RAM 218 to the image processing unit 220, where correction processing, compression, and the like are performed on the image data. The image data is subsequently recorded in the flash memory 223. The processing then returns to the step S203 to repeat the operation of the steps S203 to S208.

Figure 11:
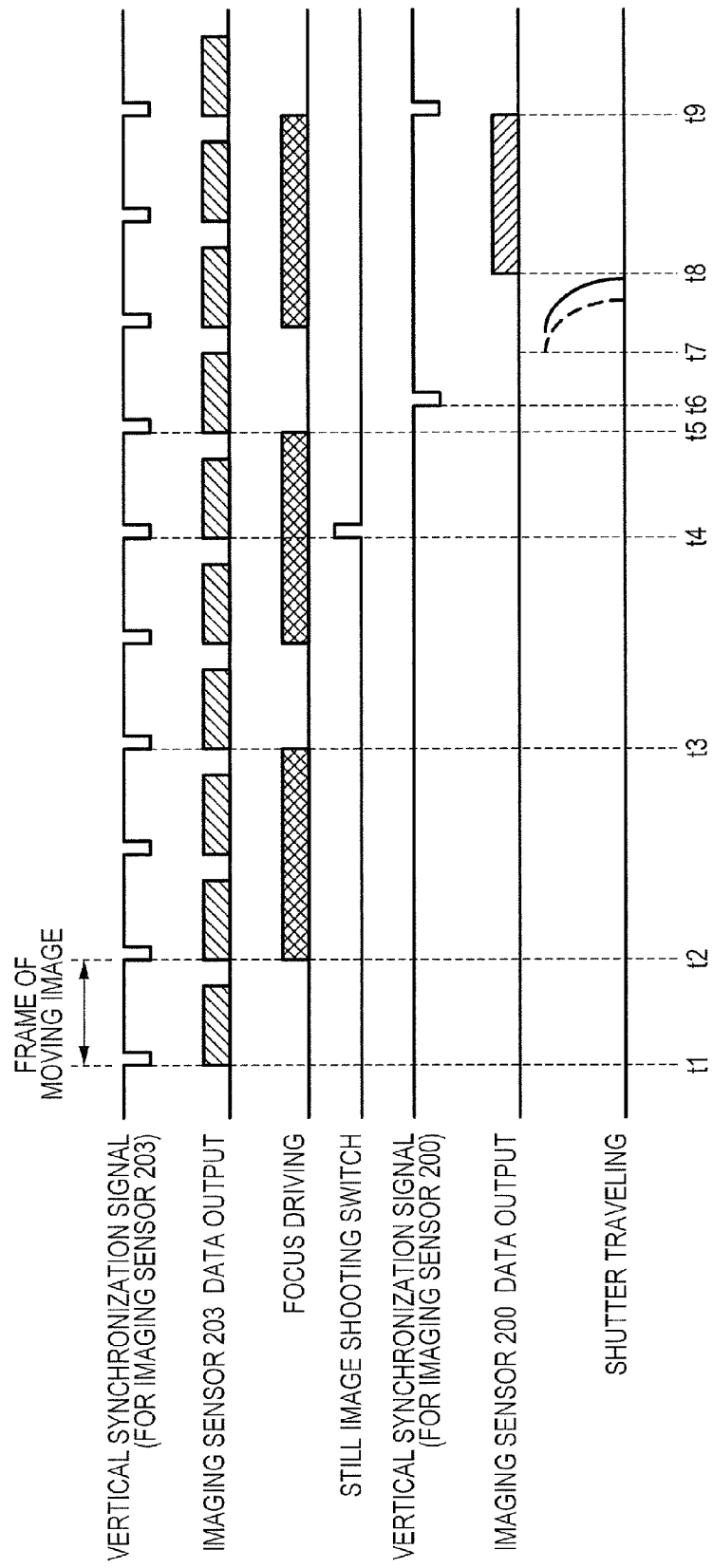
FIG. 11 illustrates the operation of the image pickup apparatus according to the second embodiment of the present invention.

The operation described above is outlined in FIG. 11. Between a time t1 and a time t2, A-image data and B-image data are output as the operation for one frame of a moving image. The AF calculation described above is calculated from the A-image data and B-image data obtained between the time t1 and the time t2, and the focus driving (the moving of the third lens unit 208) is executed at the time t2. The focus driving ends at a time t3. When a moving image is shot, the AF operation is performed constantly by repeating the operation of the time t1 to the time t3. At a time t4, the still image shooting switch is pressed but the shooting of a still image is not started because the focus driving is in progress at the time t4. After the focus driving ends at a time t5, a synchronization signal for shooting a still image is output at a time t6 and the shooting of a still image begins. At a time t7, a first shutter curtain of the focal plane shutter 206 travels first, followed by a second shutter curtain of the focal plane shutter 206, to thereby expose the imaging sensor 200 to light. Image data is then output from the imaging sensor 200 at a time t8, and is recorded in the flash memory 223 as a still image after undergoing the processing described above. With this configuration in which a still image is shot after focus driving is finished, shooting an out-of-focus image in the middle of focus driving can be avoided and a sharp still image can be obtained.

The operation described above enables the image pickup apparatus to put an image entering the imaging sensor 203 or the imaging sensor 200 into focus by performing a phase difference AF operation while shooting a moving image (live view or moving image recording), and to shoot a still image at the same time. This embodiment, too, is receptive to the modifications described in the first embodiment.

Third Embodiment

Figure 12:
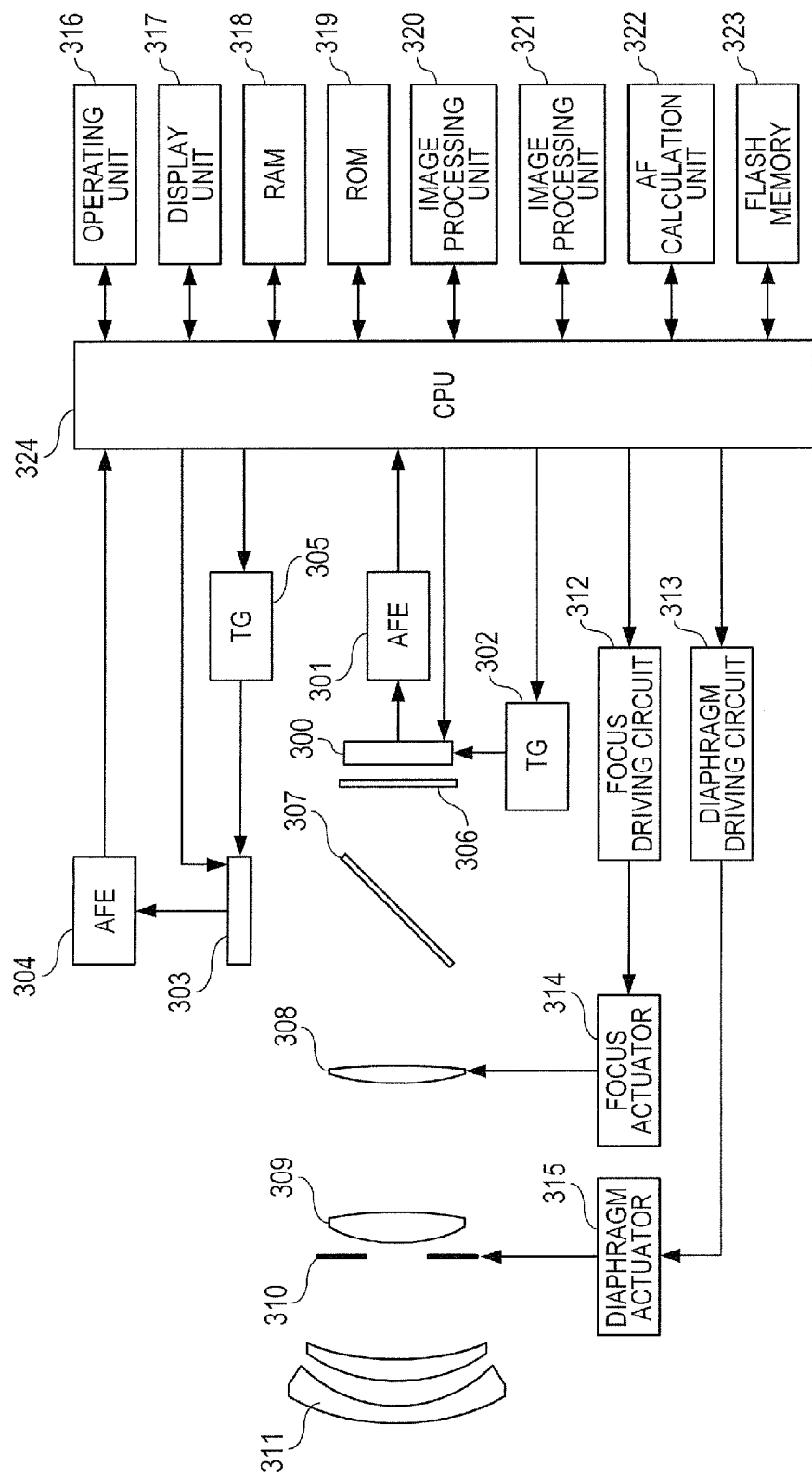
FIG. 12 illustrates the configuration of an image pickup apparatus according to a third embodiment of the present invention.

The configuration and operation of an image pickup apparatus according to a third embodiment of the present invention are described below with reference to FIG. 12. The configuration of the image pickup apparatus of this embodiment illustrated in FIG. 12 is the same as the image pickup apparatus configuration of the first embodiment, and a description thereof is omitted. This means that components 300 to 324 correspond to the components 100 to 124 of the first embodiment, respectively. The positional relation of the imaging sensor 300, the imaging sensor 303, and the half mirror 307, too, is the same as that of the imaging sensors and the half mirror in the first embodiment.

Figure 13A:
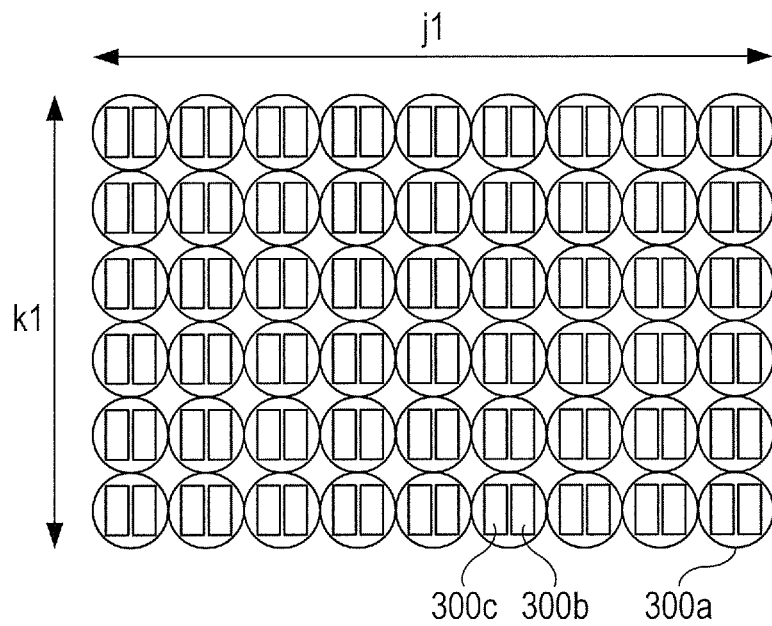
FIGS. 13A and 13B illustrate the configuration of imaging sensors according to the third embodiment of the present invention.

The first imaging sensor 300 of this embodiment is described. The configuration of the imaging sensor 300 differs from the configuration of the imaging sensor 100 of the first embodiment in the pixel array portion. The pixel array portion of the imaging sensor 300 is illustrated in FIG. 13A. Illustrated in FIG. 13A are micro lenses 300a, PDs 300c, and PDs 300b. Each pixel has two PDs for one micro lens, with the micro lens placed above the PDs. When an area where one micro lens 300a is shared constitutes one pixel, the thus configured pixels are arranged so that there are j1 pixels in the horizontal direction and k1 pixels in the vertical direction. Signals accumulated in the PDs 300b and signals accumulated in the PDs 300c are separately output to the outside by a reading operation. Separate images having a phase difference enter the PD 300b and PD 300c. Here, the PDs 300b are therefore referred to as A-image photoelectric conversion units whereas the PDs 300c are referred to as B-image photoelectric conversion units. The first imaging sensor is not limited to the configuration of this embodiment in which two PDs are provided for one micro lens. The first imaging sensor can employ any configuration in which multiple PDs are provided for one micro lens with the PDs placed longitudinally or transversally. As described above, the first imaging sensor, too, has focal point detection-use pixels in this embodiment.

Figure 15A:
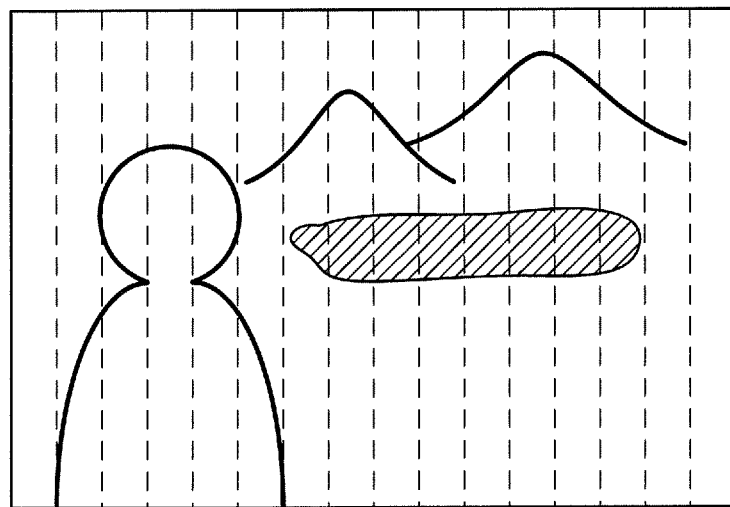
FIGS. 15A and 15B illustrate output results of the imaging sensor in the third embodiment of the present invention.
Figure 15B:
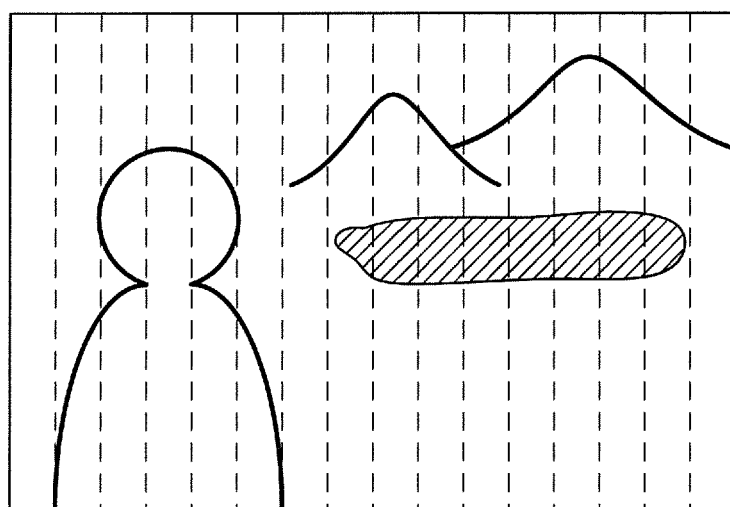

This embodiment uses A-image data, which is based on A-image photoelectric conversion unit data output from the imaging sensor 300 and corresponds to an A-image, and B-image data, which is based on B-image photoelectric conversion unit data output from the imaging sensor 300 and corresponds to a B-image, as follows. As described in the first embodiment, when the optical system is out of focus, the obtained A-image data and B-image data have a phase difference according to the out-of-focus amount. FIGS. 15A and 15B are images obtained by shooting the same subject. FIG. 15A shows A-image data and FIG. 15B shows B-image data. The data of FIG. 15A and the data of FIG. 15B are data obtained when the focus is on the person whereas the background is out of focus (have a phase difference). In other words, the phase difference between the A-image data and the B-image data depends on the distance from the subject. The phase difference between the A-image data and the B-image data can therefore be translated into what is called parallax, and an image displayed by causing the A-image data and the B-image data to enter the left eye and the right eye separately is recognizable as a stereoscopic image.

The image pickup apparatus of this embodiment has a 3D still image shooting mode in which A-image data and B-image data are handled independently and recorded in a format that allows the A-image data and the B-image data to be displayed as a three-dimensional image.

Figure 13B:
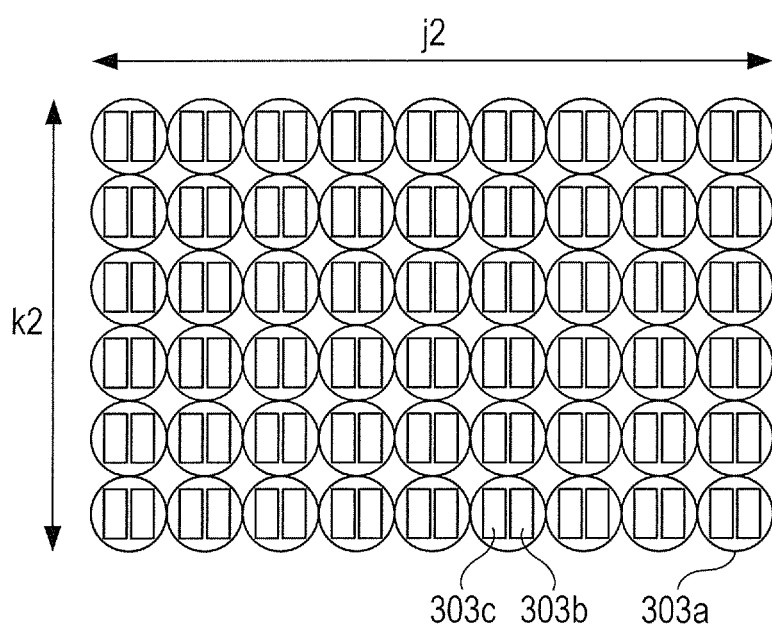

The second imaging sensor 303 is described next. The configuration of the imaging sensor 303 is the same as that of the second imaging sensor 103 of the first embodiment. A pixel array of the imaging sensor 303 is illustrated in FIG. 13B. Illustrated in FIG. 13B are micro lenses 303a, PDs 303b, and PDs 303c. Each pixel has two PDs for one micro lens, with the micro lens placed above the PDs. When an area where one micro lens 303a is shared constitutes one pixel, the thus configured pixels are arranged so that there are j2 pixels in the horizontal direction and k2 pixels in the vertical direction. Signals accumulated in the PDs 303b and signals accumulated in the PDs 303c are separately output to the outside by a reading operation. Separate images having a phase difference enter the PD 303b and PD 303c. Here, the PDs 303b are therefore referred to as A-image photoelectric conversion units whereas the PDs 303c are referred to as B-image photoelectric conversion units. The second imaging sensor is not limited to the configuration of this embodiment in which two PDs are provided for one micro lens.

Figure 14:
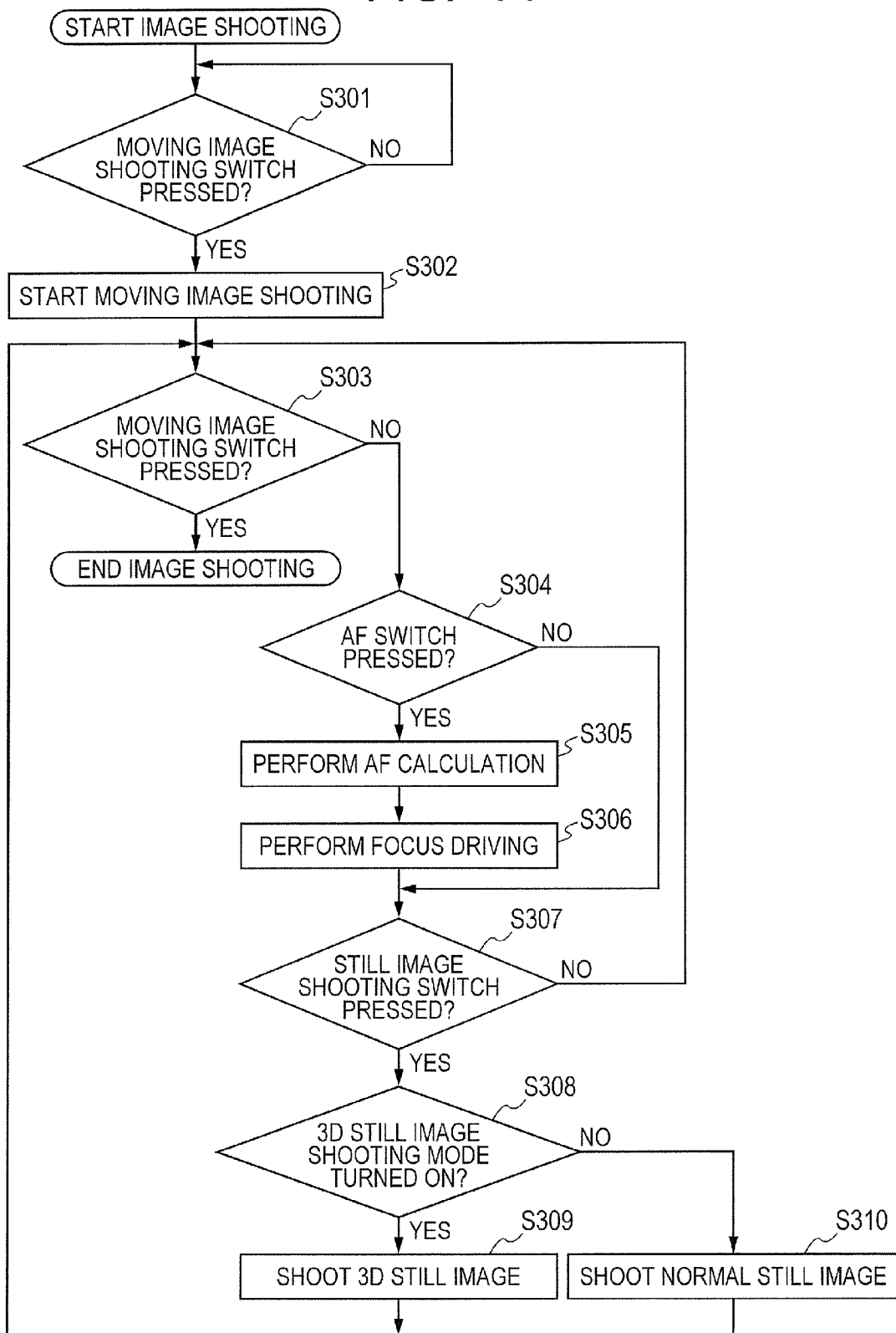
FIG. 14 is a flow chart illustrating the operation of the image pickup apparatus according to the third embodiment of the present invention.

The operation of the image pickup apparatus in this embodiment is described next with reference to a flow chart of FIG. 14. The operation of steps S301 to S307 in FIG. 14 is the same as the operation of the steps S101 to S107 described in the first embodiment, and a description thereof is omitted. In a step S308, whether or not a 3D still image shooting mode is on is determined. In the case where the 3D still image shooting mode has been turned on prior to the shooting with the use of a menu displayed by the display unit 317 and the operating unit 316, a 3D still image is shot in a step S309. When the shooting of a 3D still image begins, the imaging sensor 300, the AFE 301, and the TG 302 are powered on and the CPU 324 sets still image shooting settings. After the setting, the CPU 324 operates the focal plane shutter 306 to perform an exposure operation on the imaging sensor 300. Thereafter, the TG 302 outputs a readout pulse to the imaging sensor 300 based on a synchronization signal output from the CPU 324, and the imaging sensor 300 starts a reading operation.

Through the reading operation, the imaging sensor 300 outputs A-image data and B-image data, which are converted into digital data by the AFE 301, and then separately stored in the RAM 318. The CPU 324 transfers the A-image data and B-image data stored in the RAM 318 to the image processing unit 320, where correction processing, compression, and the like are performed on the image data. The A-image data and the B-image data are subsequently recorded in the flash memory 323 in their respective predetermined formats.

In the case where it is found in the step S308 that the 3D still image shooting mode is off, a normal still image is shot in a step S310. When the shooting of a normal still image begins, the imaging sensor 300, the AFE 301, and the TG 302 are powered on and the CPU 324 sets still image shooting settings. After the setting, the CPU 324 operates the focal plane shutter 306 to perform an exposure operation on the imaging sensor 300. Thereafter, the TG 302 outputs a readout pulse to the imaging sensor 300 based on a synchronization signal output from the CPU 324, and the imaging sensor 300 starts a reading operation. Through the reading operation, the imaging sensor 300 outputs A-image data and B-image data, which are converted into digital data by the AFE 301 and then separately stored in the RAM 318. The CPU 324 transfers the A-image data and B-image data stored in the RAM 318 to the image processing unit 320. In the image processing unit 320, pieces of data of the A-image photoelectric conversion unit and the B-image photoelectric conversion unit that are below the same micro lens are added for each pixel. A normal still image is generated in this manner. Thereafter, correction processing, compression, and the like are performed on the normal still image, which is then recorded in the flash memory 323. The processing then returns to a step S303 to repeat the operation of the steps S303 to S310.

The operation described above enables the image pickup apparatus to put an image entering the imaging sensor 303 or the imaging sensor 300 into focus by performing a phase difference AF operation while shooting a moving image (live view or moving image recording), and to shoot a still image that can be displayed in three dimensions at the same time.

This embodiment uses the imaging sensor 303 to shoot a moving image and the imaging sensor 300 to shoot a 3D still image, but the present invention is not limited to this configuration. The imaging sensor 300 may be used to shoot a moving image that can be displayed in three dimensions. The image pickup apparatus may also use pixel signals from the imaging sensor 300 and the imaging sensor 303 both in the AF operation. For instance, the imaging sensor 300 may have in each pixel an A-image photoelectric conversion unit and a B-image photoelectric conversion unit that are arranged transversally whereas the imaging sensor 303 has in pixel an A-image photoelectric conversion unit and a B-image photoelectric conversion unit that are arranged longitudinally, so that a phase difference in the transverse direction and a phase difference in the longitudinal direction are detected in the imaging sensor 300 and the imaging sensor 303, respectively. In addition, this embodiment, too, is receptive to the modifications described in the first embodiment.

Fourth Embodiment

Figure 16:
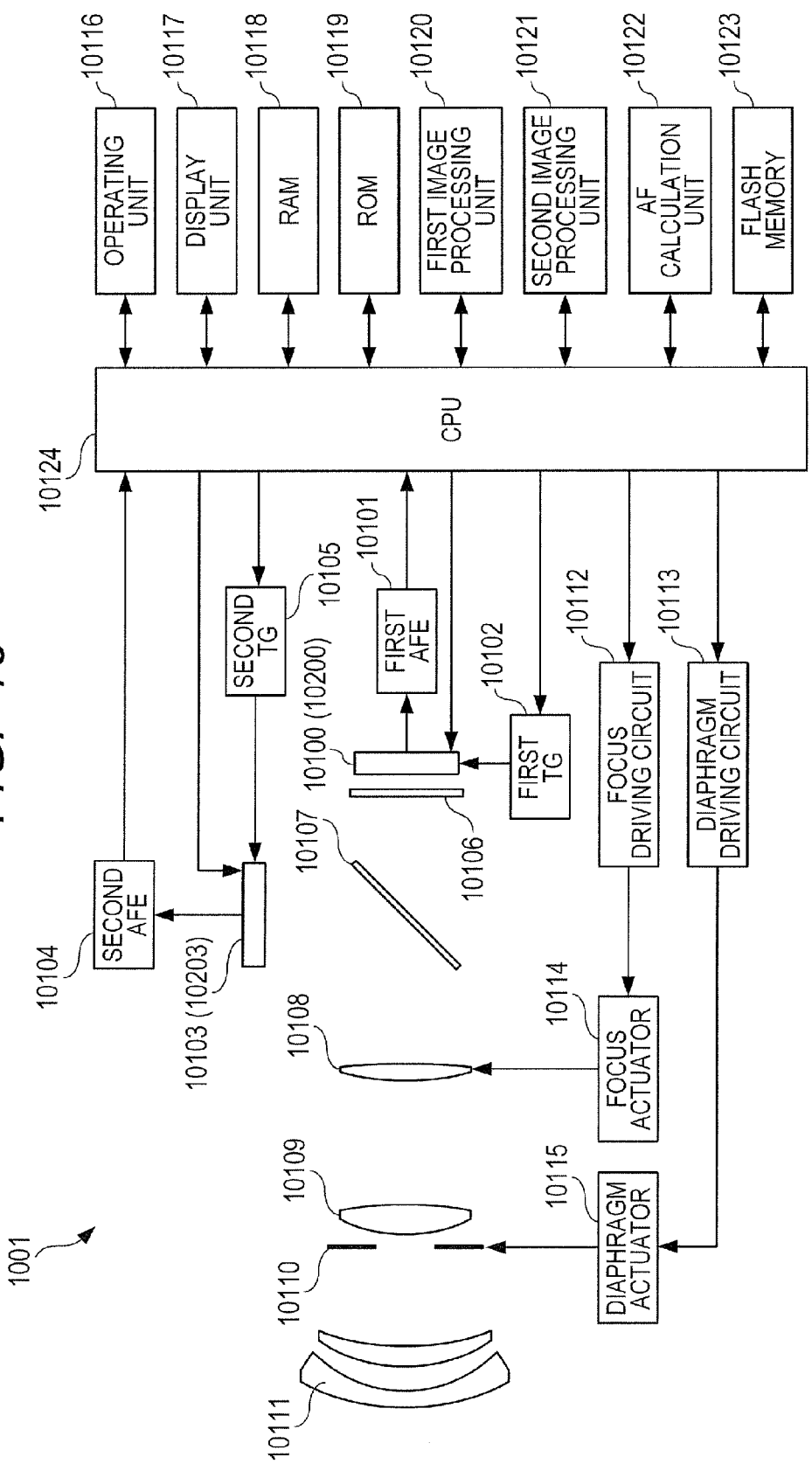
FIG. 16 illustrates a configuration example of an image pickup apparatus according to a fourth embodiment of the present invention.

FIG. 16 is a diagram illustrating a configuration example of an image pickup apparatus 1001 according to a fourth embodiment of the present invention. The image pickup apparatus 1001 includes an imaging optical system (image forming optical system) and multiple imaging sensors 10100 and 10103. A first lens unit 10111 placed at the front end (subject side) of the imaging optical system is supported by a lens barrel in a manner that allows the first lens unit 10111 to move forward and backward in an optical axis direction. A diaphragm 10110 adjusts the amount of light at the time of shooting by adjusting the diameter of its aperture. A second lens unit 10109 moves forward and backward in the optical axis direction as one with the diaphragm 10110. The second lens unit 10109 exerts a variable magnification action (zoom function) in conjunction with the forward/backward movement of the first lens unit 10111. A third lens unit 10108 is a focus lens unit which moves forward and backward in the optical axis direction, to thereby adjust the focal point.

Figure 17:
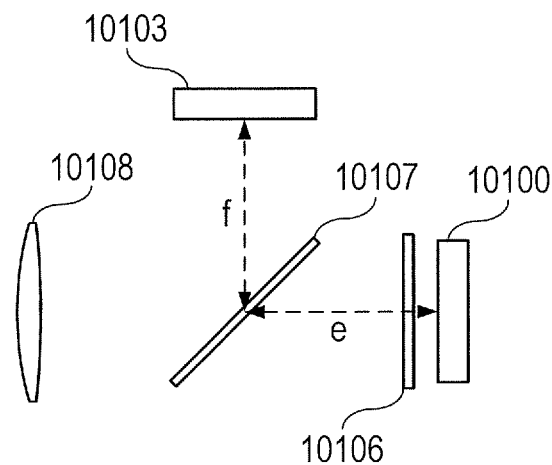
FIG. 17 is a schematic view illustrating the configuration of an image pickup portion according to the fourth embodiment of the present invention.

As illustrated in FIG. 17, a half mirror 10107 is a light beam splitting unit which splits an incident flux of light from a subject into reflected light and transmitted light. Light transmitted through the half mirror 10107 enters the imaging sensor 10100, which is a first imaging sensor, and light reflected by the half mirror 10107 enters the imaging sensor 10103, which is a second imaging sensor. A focal plane shutter 10106 adjusts the exposure time in a fraction of a second when shooting a still image. While this embodiment uses the focal plane shutter 10106 to adjust the exposure time in a fraction of a second for the first imaging sensor 10100, the present invention is not limited thereto. The first imaging sensor 10100 may have an electronic shutter function to adjust the exposure time in a fraction of a second with a control pulse.

The first imaging sensor 10100 which converts an optical image into electrical signals is used to shoot mainly a still image. A first AFE 10101 performs digital conversion on an analog image signal output from the first imaging sensor 10100 in a manner determined by gain adjustment or a predetermined quantization bit. A first TG 10102 controls the driving timing of the first imaging sensor 10100 and the first AFE 10101.

The second imaging sensor 10103 which converts an optical image into electrical signals is used to shoot mainly a moving image. A second AFE 10104 performs digital conversion on an analog image signal output from the second imaging sensor 10103 in a manner determined by gain adjustment or a predetermined quantization bit. A second TG 10105 controls the driving timing of the second imaging sensor 10103 and the second AFE 10104. Image data output by the first AFE 10101 and image data output by the second AFE 10104 are transferred to a CPU 10124. The first TG 10102 and the second TG 10105 generate drive signals in accordance with control signals from the CPU 10124, and output the drive signals to the first imaging sensor 10100 and the second imaging sensor 10103, respectively. While this embodiment uses the first AFE 10101 and the first TG 10102 which are associated with the first imaging sensor 10100 and the second AFE 10104 and the second TG 10105 which are associated with the second imaging sensor 10103, a configuration in which an AFE and a TG are built in each imaging sensor may be employed instead.

The CPU 10124 exerts overall control on the image pickup apparatus. The CPU 10124 controls a focus driving circuit 10112 and a diaphragm driving circuit 10113. For example, the CPU 10124 drives and controls a focus actuator 10114 via the focus driving circuit 10112 based on the result of focal point detection (detection information) which is conducted by an AF calculation unit 10122. This causes the third lens unit 10108 to move forward and backward in the optical axis direction as a focal point adjusting operation. The CPU 10124 also drives and controls a diaphragm actuator 10115 via the diaphragm driving circuit 10113, thereby controlling the aperture diameter of a diaphragm 10110.

Components 10116 to 10123 are connected to the CPU 10124. An operating unit 10116 is operated by a user when issuing a shooting instruction and setting shooting conditions or other conditions to the CPU 10124. A display unit 10117 displays a still image and a moving image that have been shot, a menu, and the like. The display unit 10117 includes a thin film transistor (TFT) liquid crystal display, a finder, and the like at the back of the camera main body. A RAM 10118 stores image data that has been converted through digital conversion by the first AFE 10101, image data that has been converted through digital conversion by the second AFE 10104, and data that has been processed by a first image processing unit 10120. The RAM 10118 further has a double function of an image data storing unit, which stores image data that has been processed by a second image processing unit 10121, and a work memory for the CPU 10124. These functions, though implemented via the RAM 10118 in this embodiment, may be implemented via another memory as long as the memory has a high enough access speed. A ROM 119 stores a program that is interpreted and executed by the CPU 10124. A memory device such as a flash ROM is used as the ROM 10119.

The first image processing unit 10120 performs processing such as correction and compression on a shot still image. The second image processing unit 10121 performs processing such as correction and compression on a shot moving image. The second image processing unit 10121 also has a function of adding A-image data and B-image data which are described later. The AF calculation unit 10122 conducts focal point detection based on a pixel signal output from the first imaging sensor 10100. A flash memory 10123 is a detachable memory device for recording still image data and moving image data. The recording medium which is a flash memory in this embodiment may be other data writable media such as a non-volatile memory and a hard disk. These recording media may also be in a built-in format where the recording medium is housed in a case.

FIG. 17 is a schematic view illustrating a positional relation between the first imaging sensor 10100, the second imaging sensor 10103, and the half mirror 10107. Light reflected by the half mirror 10107 enters the second imaging sensor 10103 and light transmitted through the half mirror 10107 enters the first imaging sensor 10100. A distance e from the center of the half mirror 10107 to the first imaging sensor 10100 is equal to a distance f from the center of the half mirror 10107 to the second imaging sensor 10103 (e=f). In other words, light beams of primary formed images which are subject images with an equal magnification thus enter the first imaging sensor 10100 and the second imaging sensor 10103. This ensures that a subject image formed on the second imaging sensor 10103 is in focus even when AF is controlled with the use of an image signal output by the first imaging sensor 10100.

Figure 18:
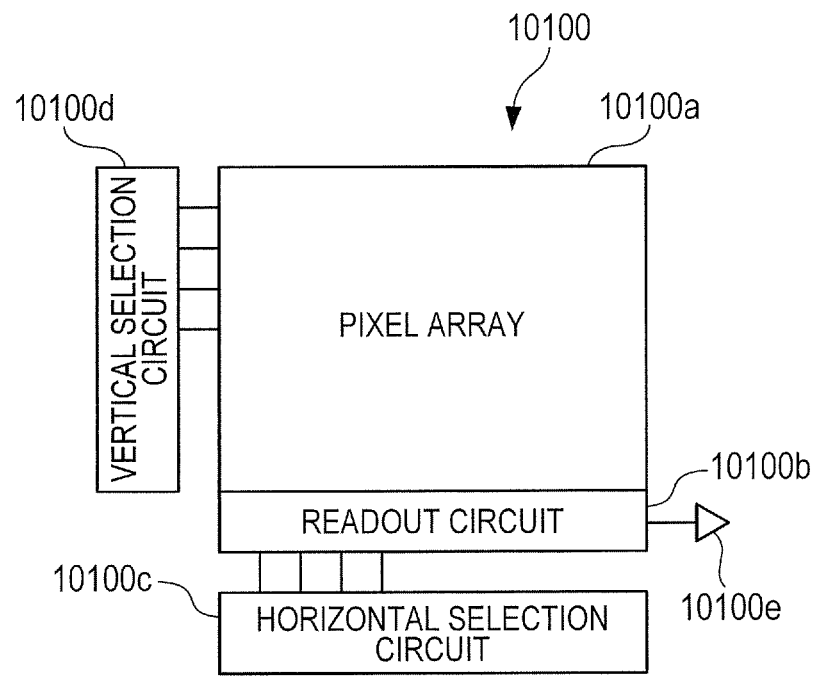
FIG. 18 illustrates a configuration example of an imaging sensor according to the fourth embodiment of the present invention.

FIG. 18 illustrates the configuration of the first imaging sensor 10100. The first imaging sensor 10100 includes a pixel array 10100a, a vertical selection circuit 10100d for selecting a row in the pixel array 10100a, and a horizontal selection circuit 10100c for selecting a column in the pixel array 10100a. A readout circuit 10100b reads signals of pixels that are selected by the vertical selection circuit 10100d and the horizontal selection circuit 10100c out of the pixels in the pixel array 10100a.

The vertical selection circuit 10100d selects a row of the pixel array 10100a and, in the selected row, activates a readout pulse which is output from the first TG 10102 based on a horizontal synchronization signal output from the CPU 10124. The readout circuit 10100b includes an amplifier and a memory for each column, and stores pixel signals of a selected row in the memory via the amplifier. One row of pixel signals stored in the memory are selected one by one in the column direction by the horizontal selection circuit 10100c to be output to the outside via an output amplifier 10100e. This operation is repeated as many times as the number of rows until all pixel signals are output to the outside. The second imaging sensor 10103 has the same configuration, and therefore a detailed description thereof is omitted.

Figure 19A:
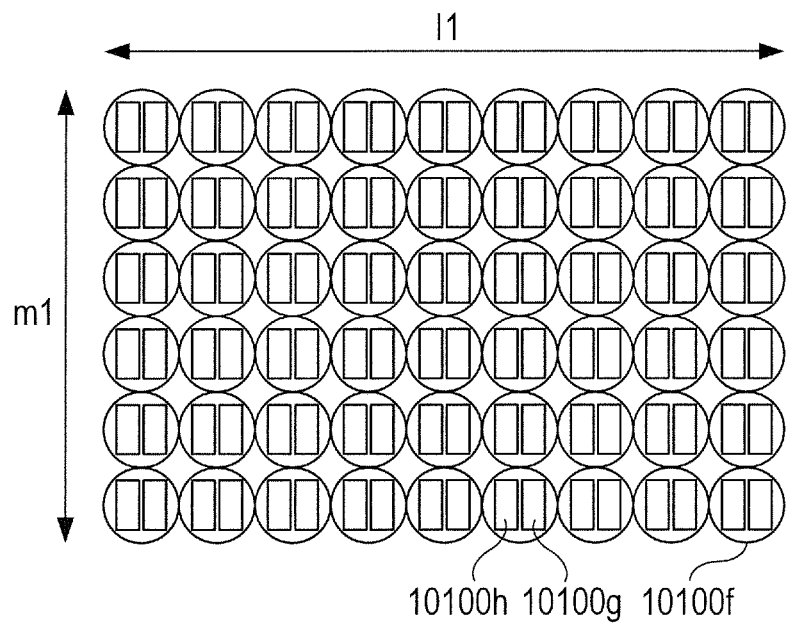
FIGS. 19A and 19B illustrate configuration examples of imaging sensors according to the fourth embodiment of the present invention.
Figure 19B:
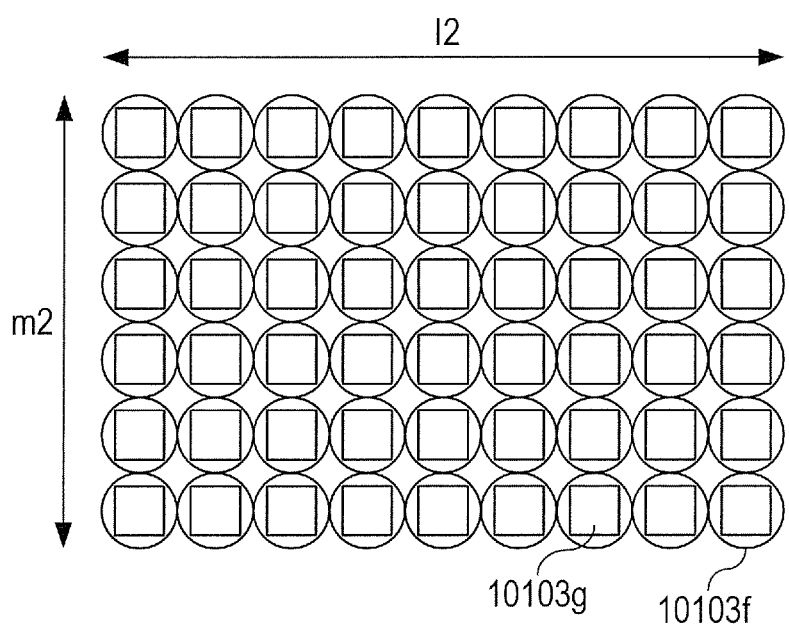

FIGS. 19A and 19B each illustrate a configuration example of the pixel array. The pixel array is made up of multiple pixel portions arranged in a two-dimensional array pattern in order to output two-dimensional image data. FIG. 19A is an exemplification of a pixel array configuration that allows phase difference detection, and FIG. 19B is an exemplification of a pixel array configuration that does not allow phase difference detection. In this embodiment, the pixel array of the first imaging sensor 10100 has the configuration of FIG. 19A and the pixel array of the second imaging sensor 10103 has the configuration of FIG. 19B.

For each micro lens 10100f, which is represented by a circular frame in FIG. 19A, multiple PDs, here, a PD 10100g and a PD 10100h, are provided which are each represented by a rectangular frame. The PD 10100g and the PD 10100h constitute multiple photoelectric conversion units. In other words, one micro lens is disposed on the subject side for every two PDs that constitute one pixel portion. When an area where one micro lens 10100f is shared constitutes one pixel, the thus configured pixels are arranged so that there are l1 pixels in the horizontal direction and m1 pixels in the vertical direction. Signals accumulated in the PDs 10100g and signals accumulated in the PDs 10100h are separately output to the outside by a reading operation. Light beams of different images having a phase difference separately enter the PDs 10100g and the PDs 10100h as described later. Hereinafter, the PDs 10100g are referred to as A-image photoelectric conversion units and the PDs 10100h are referred to as B-image photoelectric conversion units. While this embodiment shows a configuration example in which two PDs are provided for one micro lens, three or more PDs (for example, four PDs or nine PDs) may be provided for one micro lens. In short, the present invention is also applicable to a configuration in which multiple PDs are provided longitudinally or transversally for one micro lens.

In the configuration of FIG. 19B, only one PD 10103g is provided for each micro lens 10103f. In other words, one micro lens is disposed on the subject side for one PD represented by a square frame. The configured pixels are arranged so that there are l2 pixels in the horizontal direction and m2 pixels in the vertical direction. The first imaging sensor 10100 is used to shoot a still image and the second imaging sensor 10103 is used to shoot a moving image. The pixel count of the first imaging sensor 10100 (l1*m1) is therefore higher than the pixel count of the second imaging sensor 10103 (l2*m2). The second imaging sensor 10103 which is lower in pixel count than the first imaging sensor 10100 is larger in the planar dimensions of each PD and is accordingly higher in sensitivity. A flux of light is split by the half mirror 10107 so that the ratio of transmitted light and reflected light is M:N. The ratio is set to "N<M", and the ratio of light entering the second imaging sensor 10103 which is higher in sensitivity is smaller than the ratio of light entering the first imaging sensor 10100.

Figure 20A:
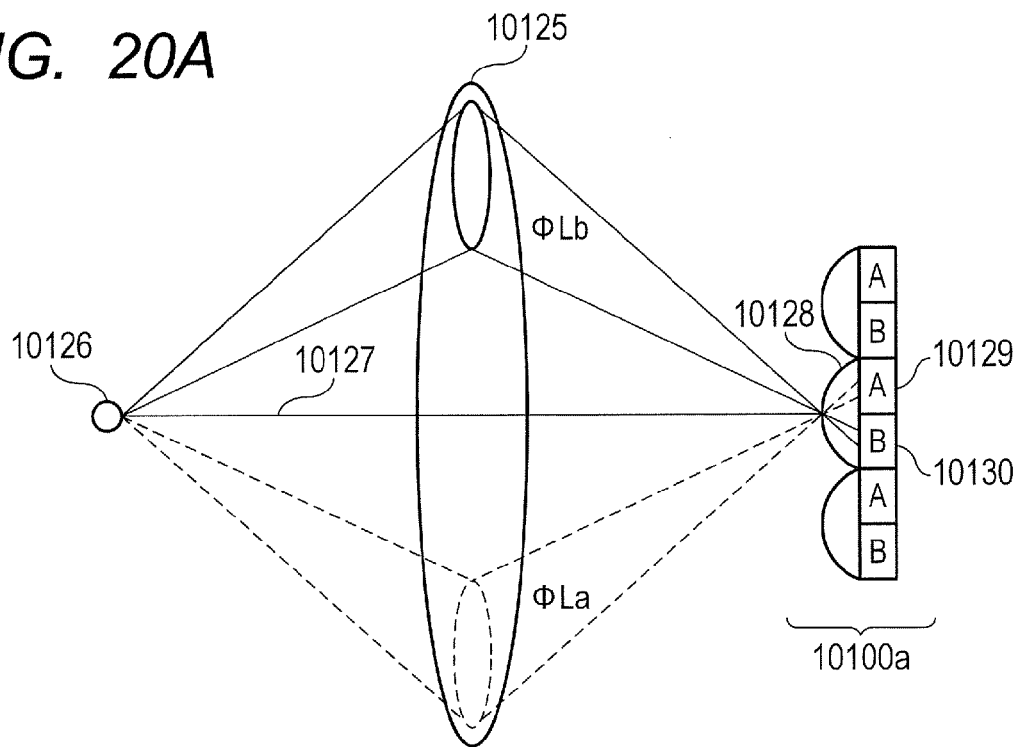
FIGS. 20A and 20B are explanatory diagrams of focal point detection in the fourth embodiment of the present invention.
Figure 20B:
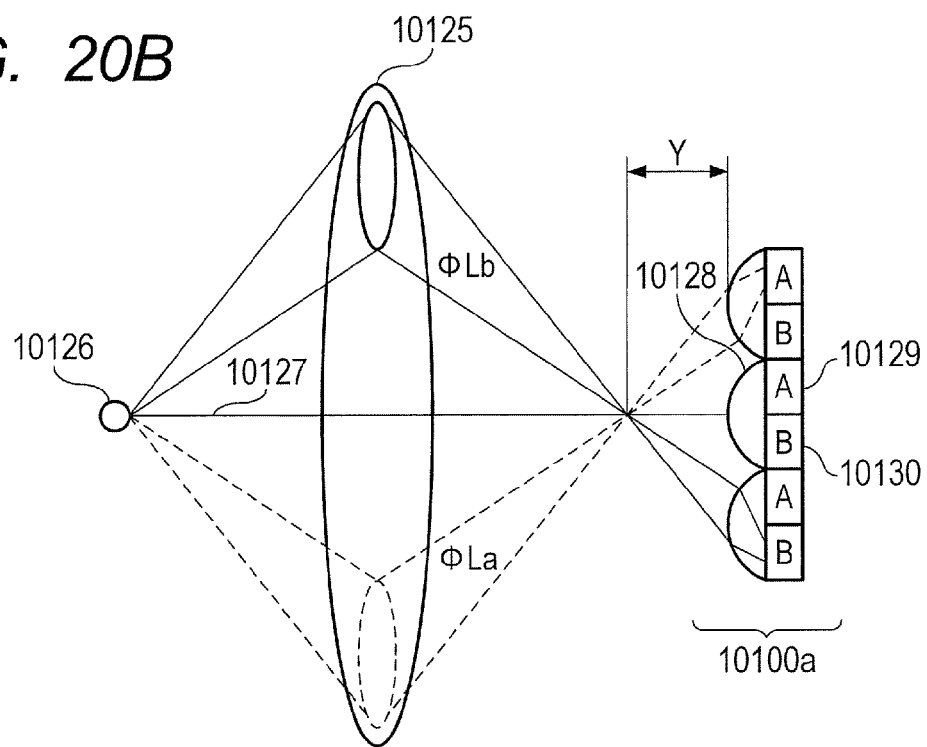

Described next are image data output from the A-image photoelectric conversion units and image data output from the B-image photoelectric conversion units in the first imaging sensor 10100 which has the pixel array configuration of FIG. 19A. FIGS. 20A and 20B are schematic views illustrating the relation between a focus state and a phase difference in the first imaging sensor 10100. FIGS. 20A and 20B illustrates a pixel array cross-section 10100a in which an A-image photoelectric conversion unit 10129 and a B-image photoelectric conversion unit 10130 are provided for one micro lens 10128. A shooting lens 10125 is an imaging optical system in which an aggregation of the first lens unit 10111, second lens unit 10109, and third lens unit 10108 of FIG. 16 is treated as one lens. Light from a subject 10126 passes areas of the shooting lens 10125 about an optical axis 10127, and forms an image on the imaging sensor. Here, the centers of the exit pupil and the shooting lens coincide with each other. Light beams from different directions pass through different areas of the shooting lens 10125. With this configuration, viewing the imaging optical system from the A-image photoelectric conversion units and viewing the imaging optical system from the B-image photoelectric conversion units are therefore equivalent to dividing the pupil of the imaging optical system symmetrically. In other words, a flux of light from the imaging optical system is split into two fluxes of light by what is called pupil division. The split fluxes of light (a first light flux ΦLa and a second light flux ΦLb) respectively enter the A-image photoelectric conversion units and the B-image photoelectric conversion units.

The first flux of light from a specific point on the subject 10126 is the light flux ΦLa, which passes through a fraction of the pupil that corresponds to the A-image photoelectric conversion unit 10129 and enters the A-image photoelectric conversion unit 10129. The second flux of light from a specific point on the subject 10126 is the light flux ΦLb, which passes through a fraction of the pupil that corresponds to the B-image photoelectric conversion unit 10130 and enters the B-image photoelectric conversion unit 10130. The two fluxes of light created by pupil division enter from the same point on the subject 10126 through the imaging optical system. The light fluxes ΦLa and ΦLb therefore pass through the same micro lens and arrive at one point on the imaging sensor as illustrated in FIG. 20A when the subject 10126 is in focus. An image signal obtained by the A-image photoelectric conversion unit 10129 and an image signal obtained by the B-image photoelectric conversion unit 10130 accordingly have a matching phase.

When the subject is out of focus by a distance Y in the optical axis direction as illustrated in FIG. 20B, on the other hand, a point at which the light flux ΦLa arrives and a point at which the light flux ΦLb arrives are off from each other by an amount of change in the angle of incidence on the micro lens that is observed in the light fluxes ΦLa and ΦLb. A phase difference is consequently caused between an image signal obtained from the A-image photoelectric conversion unit 10129 and an image signal obtained from the B-image photoelectric conversion unit 10130. Two subject images (an A-image and a B-image) which are detected by the A-image photoelectric conversion unit 10129 and the B-image photoelectric conversion unit 10130 and have a phase difference are respectively converted through photoelectric conversion by the PDs. The A-image signal and B-image signal converted by photoelectric conversion are separately output to the outside and used in an AF operation, which is described later.

Figure 21:
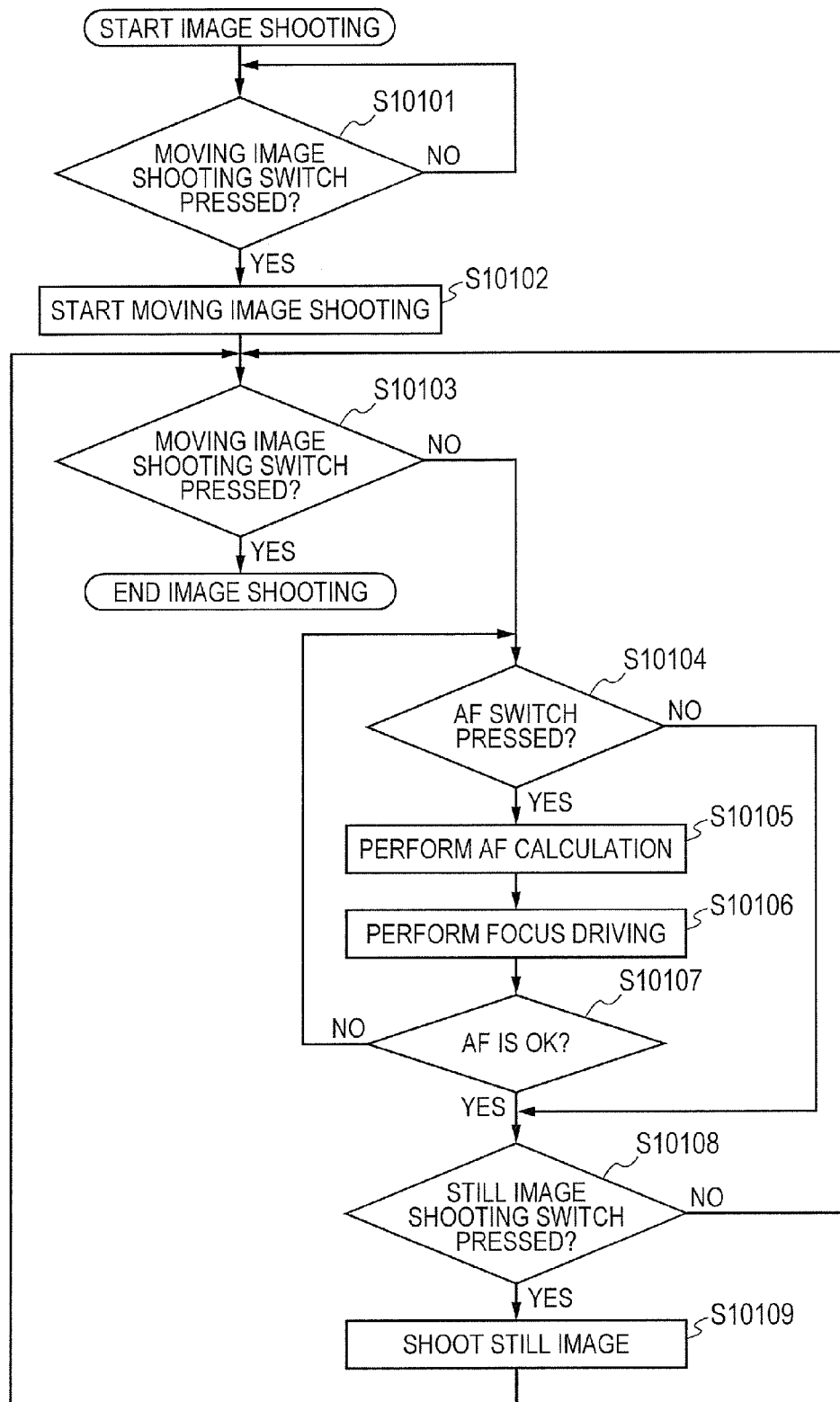
FIG. 21 is a flow chart illustrating the operation of the image pickup apparatus according to the fourth embodiment of the present invention.

The operation of the image pickup apparatus in this embodiment is described next with reference to a flow chart of FIG. 21. The following processing is implemented by the CPU 10124 by reading a program out of the memory and executing the program. First, the image pickup apparatus stands by until a moving image shooting switch which is included in the operating unit 10116 is pressed in a step S10101. When the moving image shooting switch is pressed by a user's operation, the CPU 10124 starts the shooting of a moving image in a step S10102. The second imaging sensor 10103, the second AFE 10104, and the second TG 10105 are powered on and the CPU 10124 sets moving image shooting settings. After the setting, the second TG 10105 outputs a readout pulse to the second imaging sensor 10103 based on a synchronization signal output from the CPU 10124, and the second imaging sensor 10103 starts a reading operation at a predetermined frame rate. This embodiment uses an electronic shutter function by way of a slit rolling operation for the operation of accumulating and reading electric charges of a moving image. However, the present invention is not limited thereto.

The second imaging sensor 10103 outputs image data, which is transferred to the RAM 10118 by the CPU 10124. The image data is then transferred to the second image processing unit 10121, where correction processing, compression processing, and the like are performed to create data of a frame of the moving image. The display unit 10117 displays an image represented by the created data of a frame of the moving image (live view display). In the case where the user has operated the operating unit 10116 to choose a moving image recording mode while looking at a menu displayed on the display unit 10117 prior to shooting, the moving image data is sequentially recorded in the flash memory 10123.

Figure 22:
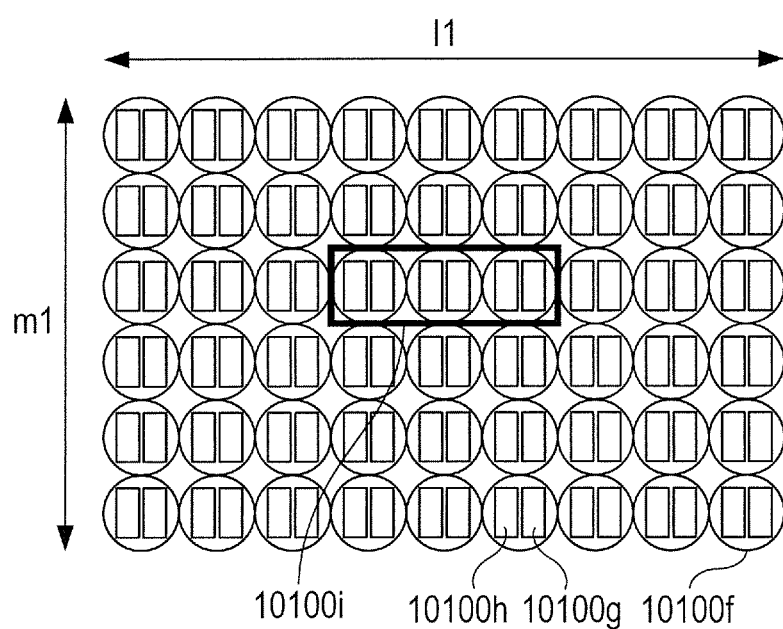
FIG. 22 illustrates a readout area of an imaging sensor according to the fourth embodiment of the present invention.

In a step S10103, the CPU 10124 determines whether or not the moving image shooting switch has been operated again. In the case where the moving image shooting switch has not been operated, the shooting of the moving image is continued and the processing proceeds to a step S10104. The shooting of the moving image is ended when it is found in the step S10103 that the moving image shooting switch has been operated. In the step S10104, the CPU 10124 determines whether or not an AF switch which is included in the operating unit 10116 has been pressed. In the case where it is determined that the AF switch has been pressed, the processing proceeds to a step S10105, where AF calculation is performed during the shooting of the moving image. When it is found in the step S10104 that the AF switch has not been pressed, the processing proceeds to a step S10108. In the step S10105, the CPU 10124 sets settings for reading pixel data out of phase difference detection-use pixels of the first imaging sensor 10100. Processing of reading pixel data out of a partial area is executed in this case, instead of reading data of the entire screen. Data is partially read out of pixel portions inside an area 10100i illustrated in FIG. 22. Fast AF calculation can be executed in this manner. In addition, with the operation time saved, power consumption is reduced. FIG. 22 illustrates reading data of three pixels out of the area 10100i as an exemplification, but the number of pixels to be read can be set arbitrarily. The partial area of the first imaging sensor 10100 out of which phase difference detection-use pixel data is read is changed suitably when the shooting conditions are changed or in response to an operation instruction or the like, and processing of reading pixel data out of the changed area is executed. The first imaging sensor 10100 outputs A-image photoelectric conversion unit data and B-image photoelectric conversion unit data, which are transferred to the RAM 10118 by the CPU 10124. The CPU 10124 transfers image data that is based on the A-image photoelectric conversion unit data stored in the RAM 10118 (A-image data corresponding to the A-image) and image data that is based on the B-image photoelectric conversion unit data stored in the RAM 10118 (B-image data corresponding to the B-image) to the AF calculation unit 10122.

Figure 23A:
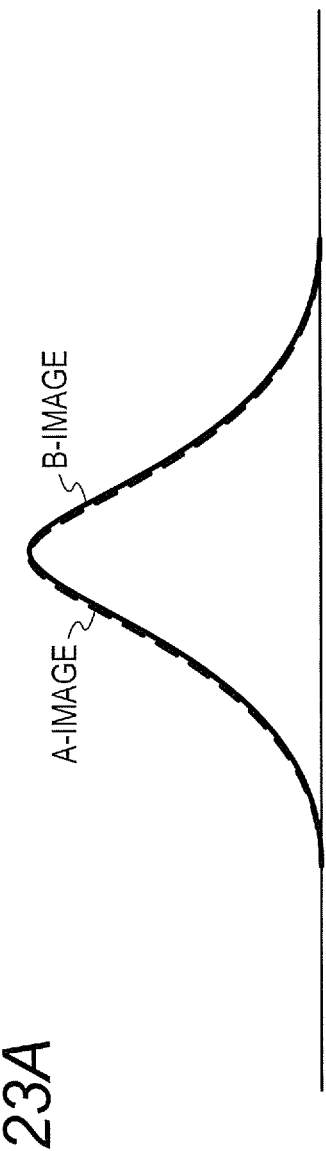
FIGS. 23A and 23B are diagrams illustrating images that are relevant to focal point detection in the fourth embodiment of the present invention.
Figure 23B:
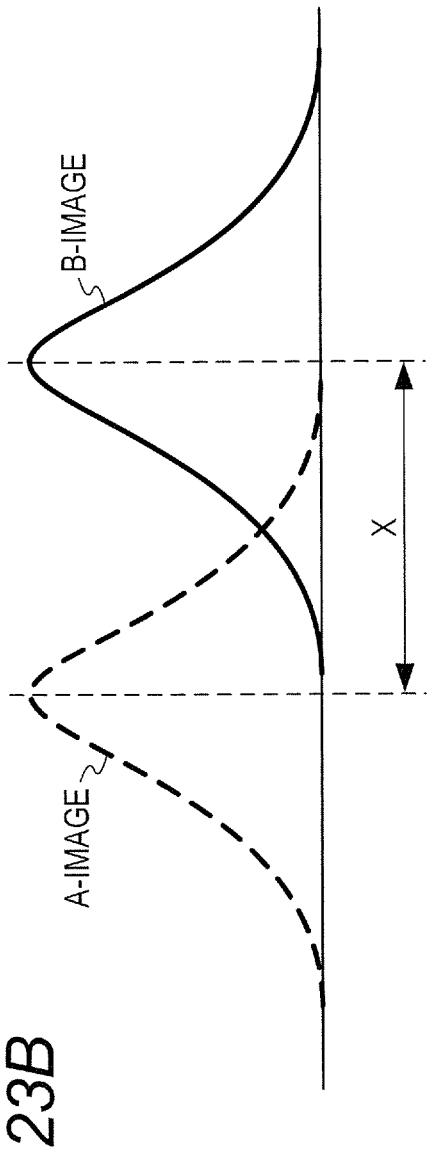

FIG. 23A is an exemplification of A-image data and B-image data that are obtained when the subject is in focus as illustrated in FIG. 20A. The horizontal axis represents pixel position and the vertical axis represents output level. The A-image data and the B-image data match when the subject is in focus as illustrated in FIG. 23A. FIG. 23B is an exemplification of A-image data and B-image data that are obtained when the subject is out of focus as illustrated in FIG. 20B. The A-image data and the B-image data in this case have a phase difference, and the pixel position of the A-image data and the pixel position of the B-image data are off from each other by a shift amount X. The AF calculation unit 10122 calculates the shift amount X for each frame of a moving image, to thereby calculate an out-of-focus amount, i.e., the Y value in FIG. 20B. The AF calculation unit 10122 transfers the calculated Y value to the focus driving circuit 10112 via the CPU 10124.

In a step S10106, the focus driving circuit 10112 calculates the drive amount of the third lens unit 10108 based on the Y value obtained from the AF calculation unit 10122, and outputs a drive command to the focus actuator 10114. The third lens unit 10108 is moved by the focus actuator 10114 to an in-focus point where the subject is in focus, and the focal point is now located on a light receiving surface of the first imaging sensor 10100. Light beams of primary formed images having the same imaging surface magnification enter the first imaging sensor 10100 and the second imaging sensor 10103 at this point, and the depth of field and the like are the same as well. The subject is therefore in focus also in the second imaging sensor 10103, when the subject is in focus in the first imaging sensor 10100. In the next step which is a step S10107, the CPU 10124 determines whether or not an in-focus state has been achieved as a result of the focus driving (in-focus determination). AF calculation is executed again in the step S10107 to that end. The processing specifics of the AF calculation are the same as in the step S10105, and a description thereof is omitted. When it is determined that the imaging optical system is in an in-focus state, the processing proceeds to the step S10108. When it is determined that the imaging optical system is not in an in-focus state, the processing returns to the step S10104. In the step S10108, the CPU 10124 determines whether or not a still image shooting switch which is included in the operating unit 10116 has been pressed. In the case where the still image shooting switch has been pressed, the processing proceeds to a step S10109. In the case where the still image shooting switch has not been pressed, the processing returns to the step S10103.

When a still image shooting operation begins in the step S10109, the CPU 10124 controls the focal plane shutter 10106 to perform an exposure operation on the first imaging sensor 10100. Thereafter, the first TG 10102 outputs a readout pulse to the first imaging sensor 10100 based on a synchronization signal output from the CPU 10124. The first imaging sensor 10100 thus starts a reading operation. Image data output from the first imaging sensor 10100 is converted into digital data by the first AFE 10101, and then stored in the RAM 10118. The CPU 10124 transfers the image data stored in the RAM 10118 to the first image processing unit 10120, where correction processing, compression processing, and the like are performed on the image data. The processed image data is recorded in the flash memory 10123. After the step S10109, the processing returns to the step S10103 to repeat the processing steps described above. In the case where it is found in the step S10104 that the AF switch has not been pressed, the processing moves to the step S10108. The same applies to the case where the AF operation has been set to "off" through an operation instruction issued via a displayed menu with the use of the display unit 10117 and the operating unit 10116.

Figure 24A:
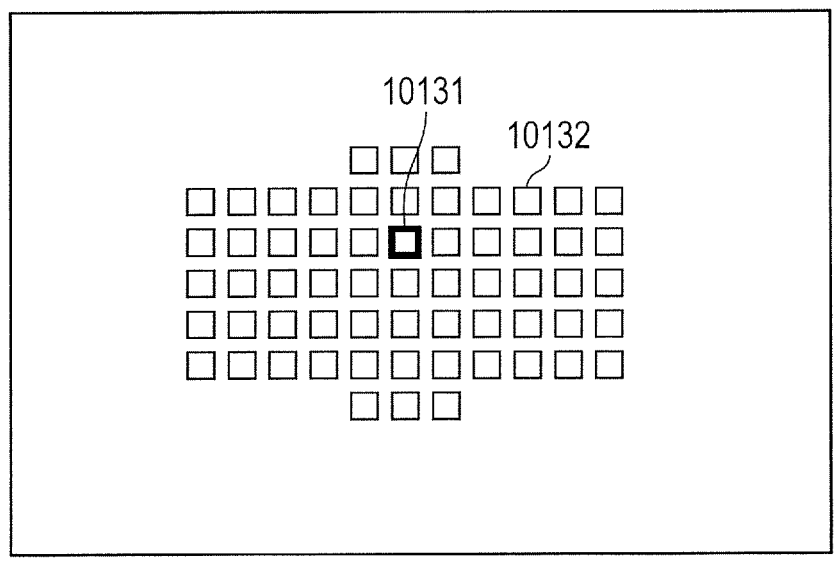
FIGS. 24A and 24B are diagrams illustrating how a focal point detection area is selected in the fourth embodiment of the present invention.
Figure 24B:
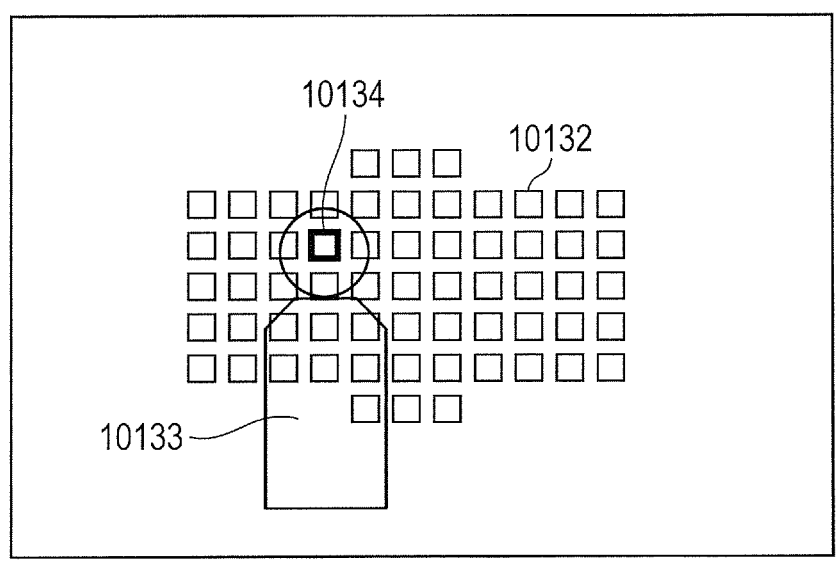

FIGS. 24A and 24B are diagrams exemplifying an AF frame (a frame in which a focal point detection area is displayed) on a shooting screen. FIG. 24A illustrates an example of AF frame selecting processing. AF frames are displayed on a screen of the display unit 10117 or the like, and the user can select an AF frame with the use of the operating unit 10116. In FIG. 24A, each AF frame 10132 represents an area that can be selected, and an AF frame 10131 represents the AF frame that is currently selected. Processing of determining an area that corresponds to the currently selected AF frame 10131 (the area 10100i of FIG. 22) is executed based on the position of the AF frame 10131 in the step S10105 of FIG. 21. Pixel data of the first imaging sensor 10100 is read out of this area and the AF calculation processing is executed. The number and areas of the AF frames in FIG. 24A are given as an exemplification, and can be designed arbitrarily.

FIG. 24B illustrates an example of processing of automatically selecting an AF frame by detecting the face area of the subject. The AF frames 10132 and a subject image 10133 are given as an exemplification in FIG. 24B. The CPU 10124 performs an image analysis on a frame of a moving image that is being shot with the second imaging sensor 10103 (a live view image can also be used), to thereby identify an subject and detect the face area of the subject. An AF frame 10134 is an AF frame that corresponds to the face area of the subject. The AF calculation processing is executed based on pixel data that corresponds to the position of the AF frame 10134. How the face of the subject is detected is not limited to a particular method.

FIGS. 25A to 25C are diagrams illustrating readout timing of phase difference detection-use pixels in this embodiment in comparison with an example of a conventional case. FIG. 25A is an exemplification of timing of reading data out of phase difference detection-use pixels of a moving image shooting-use imaging sensor in a conventional system. FIG. 25B is an exemplification of timing of reading moving image pixel data out of the second imaging sensor 10103 for shooting a moving image in this embodiment. FIG. 25C is an exemplification of timing of reading phase difference detection-use pixel data out of the first imaging sensor 10100 for shooting a still image in this embodiment. Vertical axes of FIGS. 25A to 25C represent the positions of the respective imaging sensors in the vertical direction, and horizontal axes of FIGS. 25A to 25C are time axes. The length of a period 10140 of FIG. 25A indicates an accumulation time of the imaging sensor. The accumulation time is determined by moving image shooting settings. In each period 10140, electric charges of signals of A-image photoelectric conversion units and B-image photoelectric conversion units are accumulated. Pieces of pixel data represented by signals that are accumulated in the periods 10140 are read at timing indicated by time points of oblique segments 10141, and stored in the RAM by the CPU. The stored pixel data is transferred to an image processing unit, which executes processing of adding pieces of data of the A-image photoelectric conversion unit and the B-image photoelectric conversion unit that are below the same micro lens for each pixel. Data of a frame of a moving image is created in this manner.

The length of a period 10142 indicated by a rightwards arrow indicates the processing time of AF calculation. The AF calculation processing is executed with the use of data of A-image photoelectric conversion units and B-image photoelectric conversion units in the manner described with reference to FIG. 21. The length of a period 10143 indicates the focus driving time. The focus driving processing is executed based on the result of AF calculation in the manner described with reference to FIG. 21. The system of the conventional example of FIG. 25A needs to read A-image photoelectric conversion unit data and B-image photoelectric conversion unit data in order to perform the creation of moving image frame data and AF calculation processing at readout timing that is indicated by time points of the segments 10141. The conventional system therefore cannot reach its full readout throughput (in this case, processing performance par with the frame rate of the moving image). A pixel data reading method in this embodiment which solves this problem is described below with reference to FIGS. 25B and 25C.

FIG. 25B is an exemplification of processing of reading moving image pixel data of the second imaging sensor 10103. The length of one period 10140 indicates an accumulation time of the imaging sensor for shooting a moving image. Time points of oblique segments 10144 indicate pixel data reading timing at which moving image pixel data is read. In short, only processing of reading moving image pixel data is executed at time points of the segments 10144, and the highest possible frame rate of the moving image can therefore be achieved.

The length of a period 10145 of FIG. 25C indicates an accumulation time of phase difference detection-use pixels in the first imaging sensor 10100. The accumulation time of phase difference detection-use pixels does not need to be the same as the accumulation time of moving image pixels (the period 10140), and can be set to an accumulation time suited to the AF calculation processing. The accumulation time in the example of FIG. 25C is longer than in FIG. 25B, but the present invention is not limited thereto. In this embodiment, where an accumulation time suited to the AF calculation processing can be set, an AF operation of higher precision is accomplished. Time points of segments 10146 indicate timing of reading phase difference detection-use pixel data. As has been described with respect to the area 10100*i* of FIG. 22, the readout time (required time) is greatly reduced by limiting data reading processing to a partial area among pixels of the first imaging sensor 10100. A faster AF operation is accomplished as a result. The length of a period 10147 indicates the processing time of AF calculation similarly to the period 10142 of FIG. 25A. The length of a period 10148 indicates the focus driving time similarly to the period 10143 of FIG. 25A.

According to this embodiment, a moving image shooting operation in which full readout throughput is reached is realized, and AF processing in moving image shooting is performed quickly and precisely. All pixel portions of the first imaging sensor 10100 in this embodiment include focal point detection-use pixels so that AF processing of the phase difference detection method can be conducted. However, the first imaging sensor is not limited to this configuration. For instance, the first imaging sensor 10100 may include focal point detection-use pixels that are arranged discretely and image signals that form a pair may be obtained to be used in phase difference AF processing. Each focal point detection-use pixel portion in this case has, for example, one PD for one micro lens, and focal point detection by a pupil division method is conducted with a light-shielding layer blocking light to the left or right, or the top or bottom, portion of the PD. Alternatively, the first imaging sensor 10100 may have the same pixel configuration as that of the second imaging sensor 10103 and employ contrast AF in which an AF operation is performed by detecting a contrast between pieces of image data read out of the respective pixel portions. The first imaging sensor 10100 in this case only needs to have one PD for one micro lens.

The present invention is not limited to the moving image generation of this embodiment in which a moving image is generated by adding A-image data and B-image data that are obtained by the first imaging sensor 10100 in the image processing unit. In the case where each of the A-image data and the B-image data is not necessary, for example, when focal point detection is not performed or is performed partially, A-image data and B-image data may be added within the imaging sensor for some of or all of the pixel portions before output.

Modification Example of the Fourth Embodiment

Figure 26A:
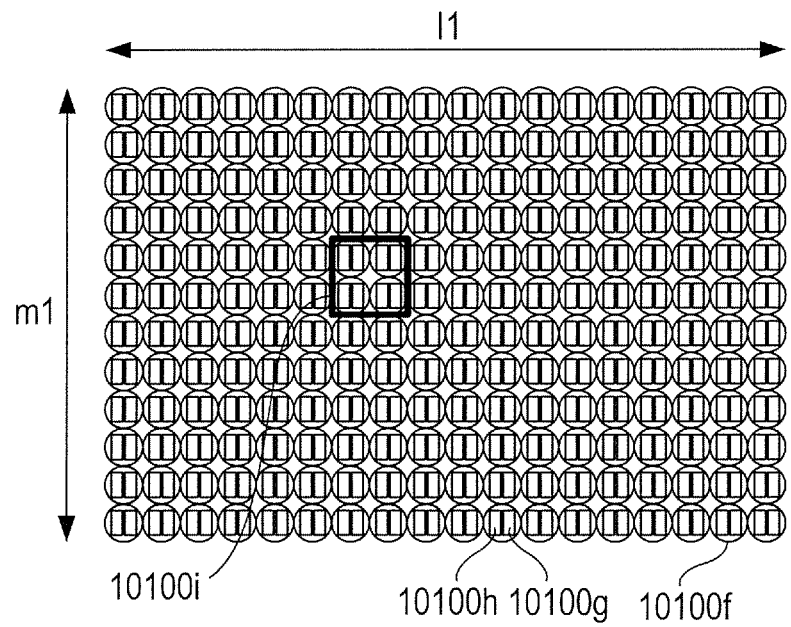
FIGS. 26A and 26B illustrate configuration examples of imaging sensors according to a modification example of the fourth embodiment of the present invention.
Figure 26B:
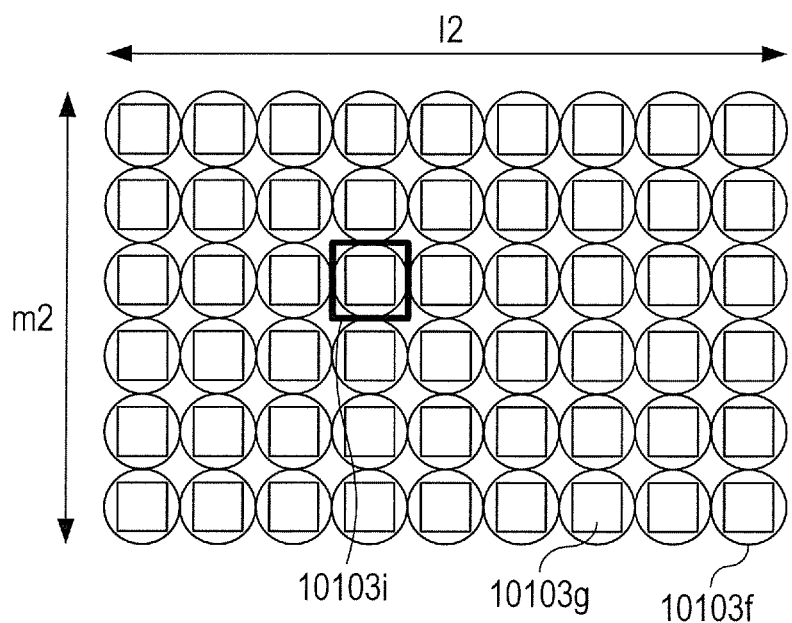

FIGS. 26A and 26B schematically illustrate a modification example of the pixel arrays of the imaging sensors. The first imaging sensor 10100 for shooting a still image is generally configured so as to have a higher pixel count than the second imaging sensor 10103 for shooting a moving image. On the other hand, the second imaging sensor 10103 is enhanced in sensitivity by making the planar dimensions per pixel larger than that of the first imaging sensor 10100. FIG. 26A is an exemplification of the pixel array of the first imaging sensor 10100, and FIG. 26B is an exemplification of the pixel array of the second imaging sensor 10103. One pixel (see 10103*i*) of the second imaging sensor 10103 of FIG. 26B corresponds to four pixels (see 10100*i*) in a pixel portion of the first imaging sensor 10100 of FIG. 26A.

The ratio of the planar dimensions per pixel of the second imaging sensor 10103 and the planar dimensions per pixel of the first imaging sensor 10100 is set to approximately 4:1 for the convenience of description, and the ratio can be changed to suit the specifications. In addition, processing of reading paired A-image photoelectric conversion unit data and B-image photoelectric conversion unit data to be used in phase difference detection can be sped up by performing addition processing on data of multiple pixels within the first imaging sensor 10100 and then reading data obtained by the addition. For instance, when the ratio of the planar dimensions per pixel of the second imaging sensor 10103 and the planar dimensions per pixel of the first imaging sensor 10100 is set to N:1, data that is obtained by adding data of N pixels which corresponds to this ratio is read out of the first imaging sensor 10100. In the modification example, an out-of-focus amount can be calculated by obtaining phase difference detection signals from pixel portions within a specific area (an area selected for focal point detection) in the first imaging sensor 10100, which is capable of pixel outputs of higher definition than that of the second imaging sensor 10103.

Fifth Embodiment

Figure 27A:
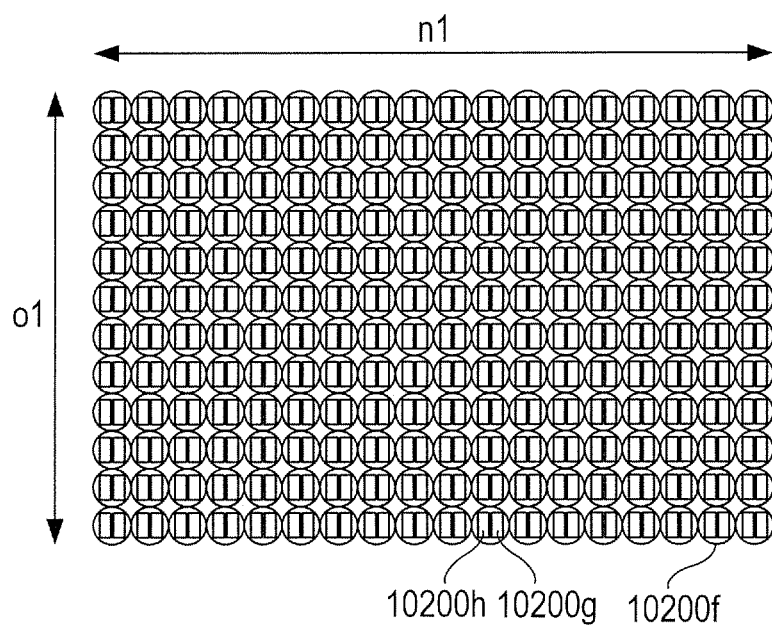
FIGS. 27A and 27B illustrate configuration examples of imaging sensors according to a fifth embodiment of the present invention.
Figure 27B:
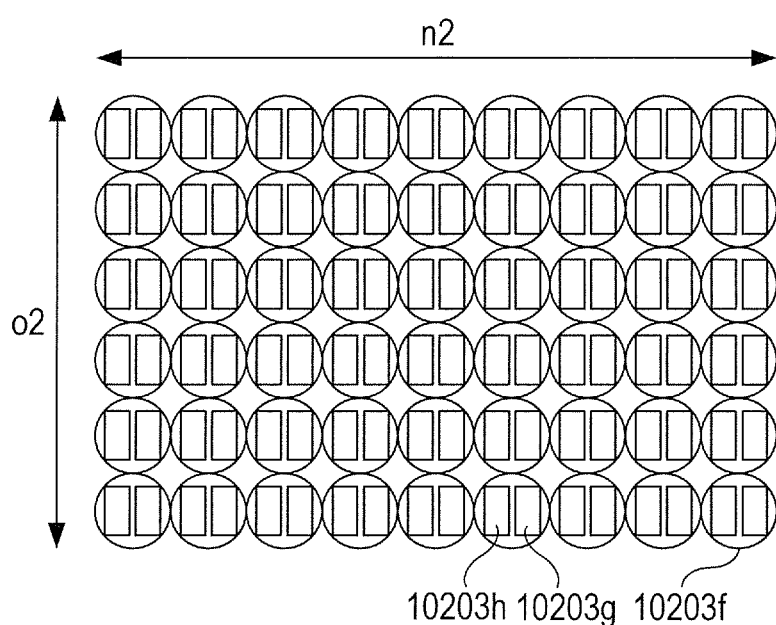

A fifth embodiment of the present invention is described next. In the fifth embodiment, components similar to the ones in the fourth embodiment are denoted by symbols that have been used, with the exception of a first imaging sensor 10200 and a second imaging sensor 10203. This is for omitting detailed descriptions of those components and concentrating on differences of the fifth embodiment. The basic configuration of an image pickup apparatus according to the fifth embodiment is the same as the configuration of FIG. 16, except for the pixel array configurations of the first imaging sensor 10200 and the second imaging sensor 10203. FIG. 27A illustrates a configuration example of the pixel array of the first imaging sensor 10200, and FIG. 27B illustrates a configuration example of the pixel array of the second imaging sensor 10203.

In FIG. 27A, two PDs 10200*g* and 10200*h* are provided for one micro lens 10200*f*. When an area where one micro lens 10200*f* is shared constitutes one pixel, the thus configured pixels are arranged so that there are n1 pixels in the horizontal direction and o1 pixels in the vertical direction. A comparison to FIG. 19A shows that pixels are distributed densely with a higher pixel count per unit area. In FIG. 27B, two PDs 10203*g* and 10203*h* are provided for one micro lens 10203*f*. The thus configured pixels are arranged so that there are n2 pixels in the horizontal direction and o2 pixels in the vertical direction. The second imaging sensor 10203 which is used to shoot a moving image is lower in pixel count and larger in planar dimensions per pixel than the first imaging sensor 10200 which is used to shoot a still image. The first imaging sensor 10200 and the second imaging sensor 10203 both include phase difference detection-use pixels in this embodiment.

Figure 28:
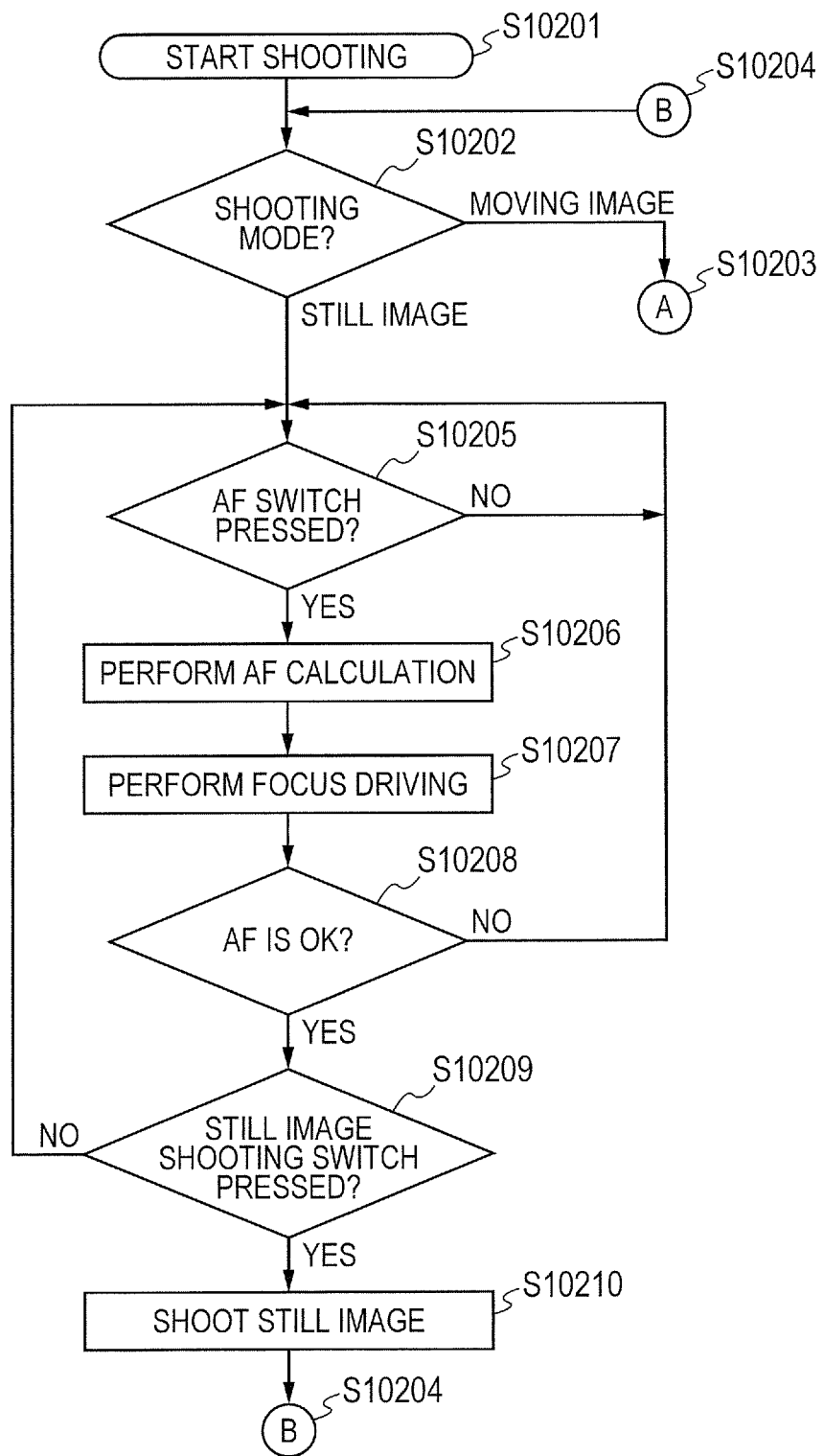
FIG. 28 is a flow chart illustrating the operation of an image pickup apparatus according to the fifth embodiment of the present invention, and illustrates the first half of processing.
Figure 29:
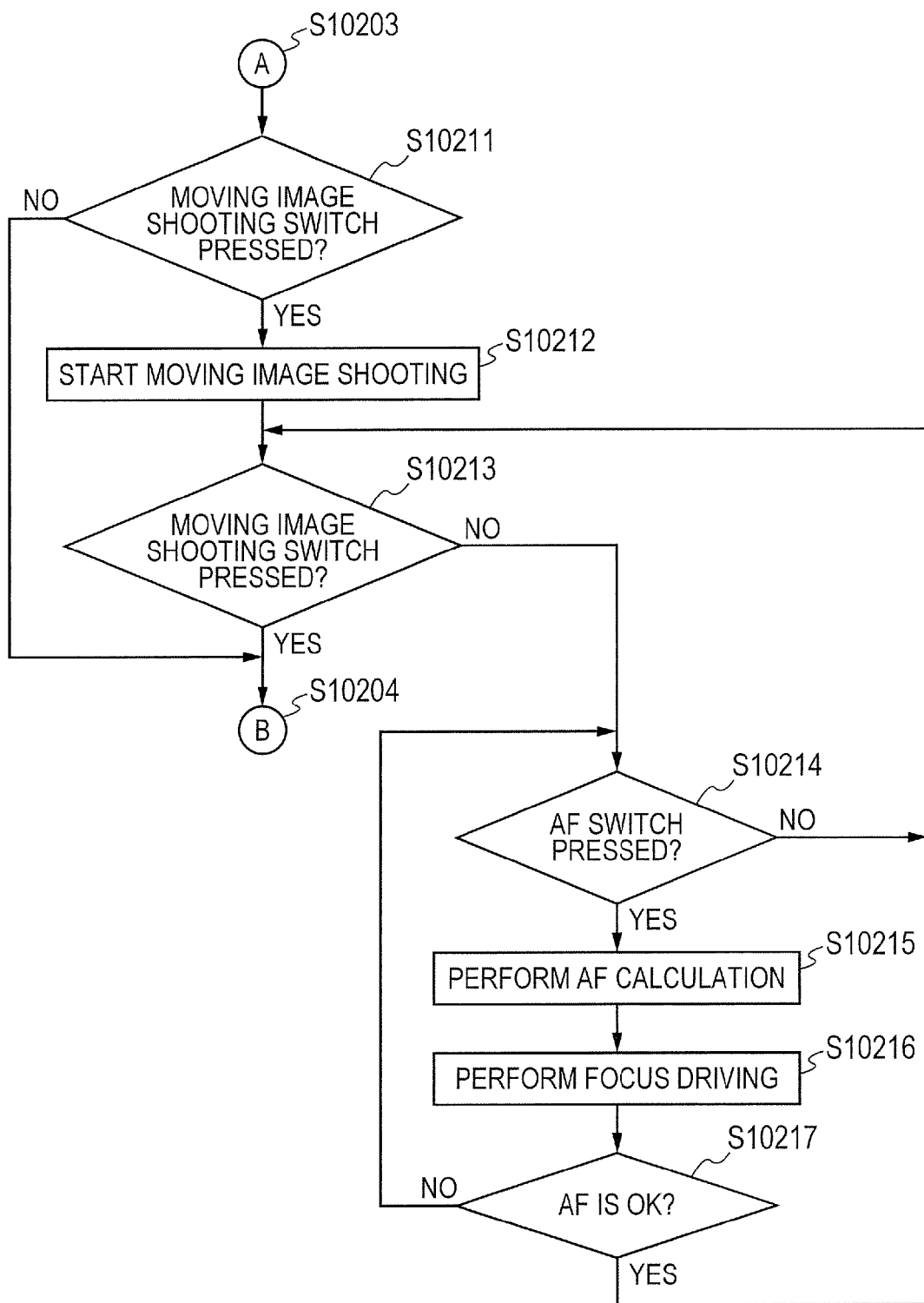
FIG. 29 is a flow chart illustrating subsequent steps of the processing of FIG. 28.

An imaging operation of this embodiment is described next with reference to flow charts of FIGS. 28 and 29. The imaging operation begins in a step S10201 of FIG. 28, and the CPU 10124 determines the shooting mode in a step S10202. When the shooting mode is a still image shooting mode, the processing moves to a step S10205, where a still image shooting preparation operation is performed. When the shooting mode is a moving image shooting mode, the processing moves from a step S10203 to a step S10211 of FIG. 29. A user can select a shooting mode by using the operating unit 10116, or by operating a touch panel while looking at a menu screen which is displayed on the display unit 10117.

Processing in the still image shooting mode is described first. In the step S10205 of FIG. 28, the CPU 10124 determines the operation state of an AF switch which is included in the operating unit 10116. The processing proceeds to the step S10206 in the case where the AF switch has been pressed. In the case where the AF switch has not been pressed, the image pickup apparatus enters a standby state and the determination processing of the step S10205 is repeated. In the step S10206, AF calculation processing is executed during the shooting of a still image. Specifically, the second imaging sensor 10203, the second AFE 10104, and the second TG 10105 are powered on, and the CPU 10124 sets settings for reading data out of phase difference detection-use pixels of the second imaging sensor 10203. The second imaging sensor 10203 outputs A-image photoelectric conversion unit data and B-image photoelectric conversion unit data, which are transferred to the RAM 10118 by the CPU 10124. The CPU 10124 transfers A-image data, which is based on the A-image photoelectric conversion unit data stored in the RAM 10118 and corresponds to an A-image, and B-image data, which is based on the B-image photoelectric conversion unit data stored in the RAM 10118 and corresponds to a B-image, to the AF calculation unit 10122. The flow charts of FIGS. 28 and 29 are, for the convenience of description, not for the case where still image shooting and moving image shooting are performed concurrently. However, in the case where live view shooting has been specified, the CPU 10124 executes live view setting processing in the step S10206. In the case where moving image shooting is specified in the step S10206, the CPU 10124 executes processing of setting moving image shooting settings.

In the next step which is a step S10207, the focus driving circuit 10112 calculates the drive amount of the third lens unit 10108 based on the out-of-focus amount obtained from the AF calculation unit 10122, and outputs a drive command to the focus actuator 10114. The third lens unit 10108 is moved by the focus actuator 10114 to an in-focus point, and the focal point is now located on a light receiving surface of the second imaging sensor 10203. Light beams of primary formed images having the same imaging surface magnification enter the first imaging sensor 10200 and the second imaging sensor 10203 at this point, and the depth of field and the like are the same as well. Therefore, when the subject is in focus in the second imaging sensor 10203, the same subject is in focus also in the first imaging sensor 10200. In the next step which is a step S10208, the CPU 10124 determines whether or not an in-focus state has been achieved. AF calculation is executed again to that end. The processing specifics of the AF calculation are the same as in the step S10206. When it is determined in the step S10208 that the optical system is in an in-focus state, the processing proceeds to a step S10209. When it is determined that the optical system is not in an in-focus state, the processing returns to the step S10205.

In the step S10209, the CPU 10124 determines whether or not a still image shooting switch which is included in the operating unit 10116 has been pressed. In the case where the still image shooting switch has been pressed, the processing moves to a step S10210, where a still image shooting operation is performed. Thereafter, the processing returns to the S10202 through a step S10204. When it is found in the step S10209 that the still image shooting switch has not been pressed, the processing returns to the step S10205.

The operation in the moving image shooting mode is described next with reference to FIG. 29. In the step S10211, the CPU 10124 determines the operation state of a moving image shooting switch which is included in the operating unit 10116. In the case where the moving image shooting switch has been pressed, the processing moves to a step S10212, where a moving image shooting operation is started. In the case where the moving image shooting switch has not been pressed, the processing returns to the step S10202 of FIG. 28 via the step S10204. When the shooting of a moving image begins in the step S10212, the second imaging sensor 10203, the second AFE 10104, and the second TG 10105 are powered on and the CPU 10124 sets moving image shooting settings. After the setting, the second TG 10105 outputs a readout pulse to the second imaging sensor 10203 based on a synchronization signal output from the CPU 10124. The second imaging sensor 10203 starts a reading operation at a predetermined frame rate. This embodiment uses an electronic shutter function by way of a slit rolling operation for the operation of accumulating and reading electric charges of a moving image. The second imaging sensor 10203 outputs pixel data, which is transferred to the RAM 10118 by the CPU 10124. The pixel data is then transferred to the second image processing unit 10121, where correction processing, compression processing, and the like are performed to create data of a frame of the moving image. The display unit 10117 displays (live view) a moving image represented by the created data of a frame of the moving image on a screen. In the case where the user has issued an instruction to choose recording a moving image with the use of a menu screen displayed on the display unit 10117 and the operating unit 10116 prior to shooting, the moving image data is sequentially recorded in the flash memory 10123.

In a step S10213, the CPU 10124 determines whether or not the moving image shooting switch has been pressed again. In the case where the moving image shooting switch has not been pressed, the shooting of the moving image is continued and the processing proceeds to a step S10214. The shooting of the moving image is ended when the moving image shooting switch is pressed, and the processing returns to the step S10202 of FIG. 28 via the step S10204. In the step S10214, the CPU 10124 determines the operation state of the AF switch included in the operating unit 10116. In the case where the AF switch has been pressed, the processing proceeds to a step S10215. When it is found in the step S10214 that the AF switch has not been pressed, the processing returns to the step S10213. In the step S10215, AF calculation processing is performed during the shooting of the moving image. Specifically, the first imaging sensor 10200, the first AFE 10101, and the first TG 10102 are powered on and the CPU 10124 sets settings for reading data out of phase difference detection-use pixels of the first imaging sensor 10200. When reading data out of phase difference detection-use pixels of the first imaging sensor 10200, pixel data within a limited target area is partially read, instead of reading data out of the entire area, to speed up AF calculation. This saves the operation time and power consumption is accordingly reduced.

In a step S10216, the focus driving circuit 10112 calculates the drive amount of the third lens unit 10108 based on the out-of-focus amount obtained from the AF calculation unit 10122, and outputs a drive command to the focus actuator 10114. The third lens unit 10108 is moved to an in-focus point. In the next step which is a step S10217, the in-focus determination processing is performed after AF calculation is executed again. The processing moves to the step S10213 when it is determined that the optical system is in focus. The processing returns to the step S10214 when it is determined that the optical system is out of focus.

Through the operation described above, the imaging sensor that executes phase difference detection is switched depending on the shooting mode. Specifically, data is read out of phase difference detection-use pixels of the second imaging sensor 10203 in the still image shooting mode, and data is read out of phase difference detection-use pixels of the first imaging sensor 10200 in the moving image shooting mode. By switching imaging sensors depending on the shooting mode, the image pickup apparatus can reach its full readout throughput for moving image shooting. In addition, the AF operation in moving image shooting is performed quickly and precisely.

Figure 30A:
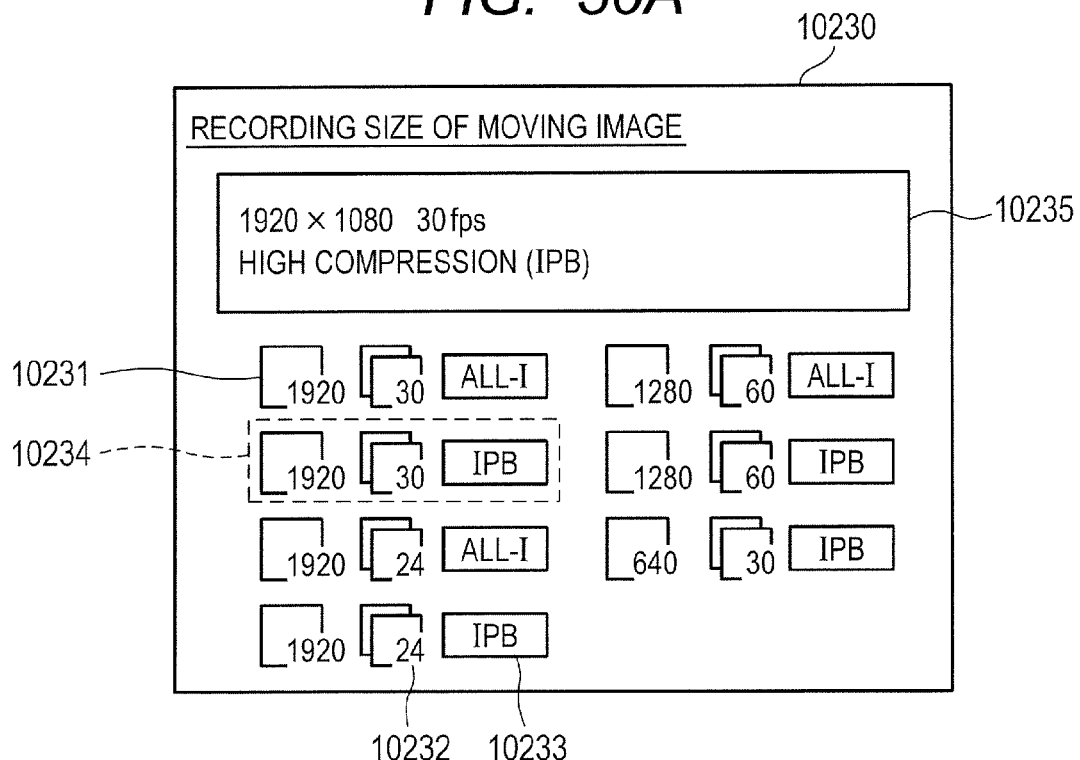
FIGS. 30A and 30B illustrate an example of shooting settings screens according to the fifth embodiment of the present invention.
Figure 30B:
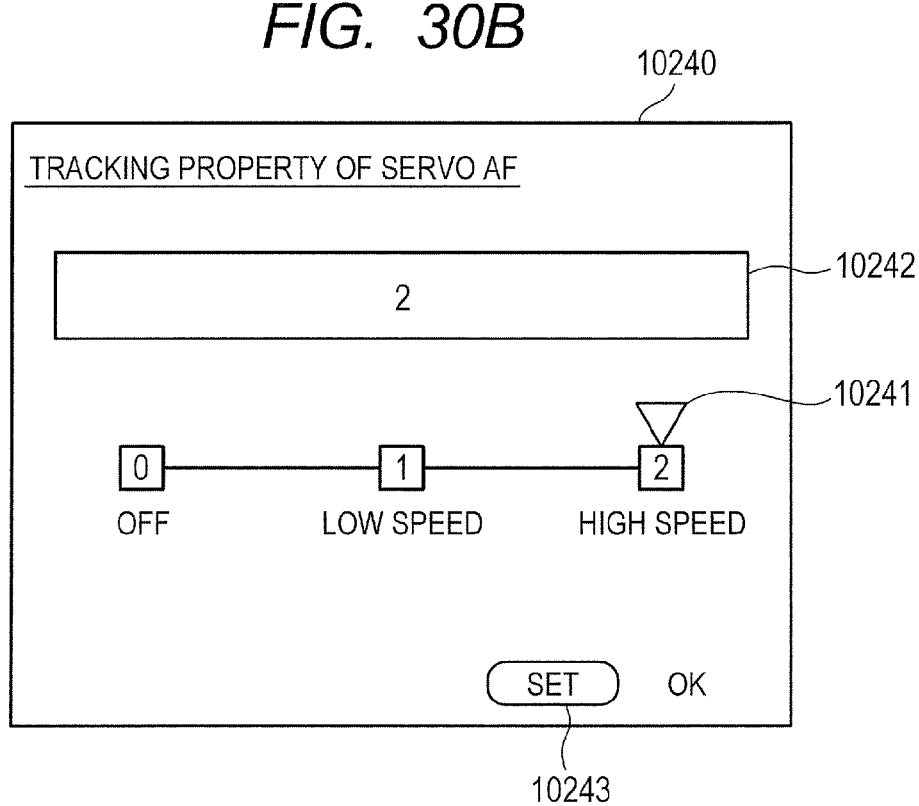

Setting operation is described next with reference to FIGS. 30A and 30B. FIGS. 30A and 30B illustrate, as examples of the display unit 10117, a moving image recording size setting screen 10230 and a subject tracking property setting screen 10240. In this embodiment, the operating unit 10116, the display unit 10117, and the CPU 10124 perform recording size setting processing for setting the recording size of a moving image and frame rate setting processing for setting the frame rate of a moving image. FIG. 30A illustrates an example of a screen for setting a moving image recording size 10231, a moving image frame rate 10232, and a moving image compression format 10233. As the recording size of a moving image, the user can select from, for example, the following image quality options (shortened as "1920", "1280", and "640" in the drawing).

Full high vision (full high definition (HD)) image quality at 1,920 pixels by 1,080 pixels High vision (HD) image quality at 1,280 pixels by 720 pixels Standard image quality at 640 pixels by 480 pixels As the frame rate of a moving image in the case where the video system used in television broadcasting is of National Television System Committee (NTSC), the user can choose from a rate of 30 frames and a rate of 60 frames. In the case where the video system used in television broadcasting is of Phase Alternation by Line (PAL), the user can choose from a rate of 25 frames and a rate of 50 frames. In an example cinema-related use, a rate of 24 frames can be selected. Illustrated in FIG. 30A is a display example of the case where the NTSC system is used. As the moving image compression format, the user can choose from IPB in which data is efficiently compressed and recorded multiple frames at a time, All-I in which data is compressed and recorded one frame at a time, and the like. When the user selects an intended setting item by operating the operating unit 10116 or other components, details of the selected setting item are displayed inside a display field 10235 on the screen.

Depending on which moving image recording size and which moving image frame rate are set, the second imaging sensor 10203 does not need to reach its full readout throughput in some cases. For instance, when the standard image quality is selected as the moving image recording size, the necessary readout throughput can be kept low by thinning out pieces of pixel data of the second imaging sensor 10203. In this embodiment, when the recording size of a moving image that is set in the recording size setting processing is equal to or less than a threshold, the AF calculation unit 10122 obtains pixel data output by the second imaging sensor 10203 to conduct focal point detection. The readout throughput required of an imaging sensor is not so high also when the moving image frame rate is at a rate of 24 frames to 30 frames. In this embodiment, when the frame rate that is set in the frame rate setting processing is equal to or less than a threshold, the AF calculation unit 10122 obtains pixel data output by the second imaging sensor 10203 to conduct focal point detection. Performing phase difference detection with the second imaging sensor 10203 reduces the overall power consumption of the system significantly.

FIG. 30B is an exemplification of the subject tracking property setting screen 10240. "Servo AF" is a function of changing the position of the focal point of the imaging optical system in focal point detection while tracking the subject, and is useful for the tracking of a moving object or the like. The operating unit 10116, the display unit 10117, and the CPU 10124 perform function setting processing for enabling or disabling this function. The user uses the operating unit 10116 to operate a selecting cursor 10241 in the left-right direction, and enters a set position with a "set" button 10243 of the operating unit 10116. The set value is displayed in a display field 10242 on the screen. The tracking property can be set with respect to a subject when the speed of a moving object changes greatly at an instance, such as when the subject starts moving suddenly or stops suddenly.

Depending on the settings of subject tracking property, the subject tracking property does not need to be enhanced in some cases even when the image pickup apparatus is configured so that phase difference detection is conducted with the second imaging sensor 10203. When the tracking property is not required, in other words, when the servo AF function is disabled ("off" in the drawing), the AF calculation unit 10122 obtains pixel data output by the second imaging sensor 10203 to conduct focal point detection. Performing phase difference detection with the second imaging sensor 10203 reduces the overall power consumption of the system significantly. Quickness is not required when a subject moves at a substantially constant speed or when a tracking property is set with respect to a slow moving object. Therefore, when the set value is equal to or less than a threshold, the overall power consumption of the system is reduced significantly by performing phase difference detection with the second imaging sensor 10203. When shooting a subject that makes a sudden move, rapidly accelerates or decelerates, stops abruptly, or the like, on the other hand, quickness is required of the tracking property of the AF operation. In the case where the set value exceeds a threshold, a fast and precise AF operation is accomplished by using the second imaging sensor 10203 mainly for the shooting of a moving image and performing phase difference detection with the first imaging sensor 10200.

According to this embodiment, which imaging sensor is used for phase difference detection is switched depending on shooting settings (including the recording size and the frame rate) and AF settings (including the subject tracking property). The overall power consumption of the system can thus be reduced.

According to the present invention, an image pickup apparatus capable of focusing by AF during the shooting of a moving image and shooting a still image without stopping the shooting of the moving image can be provided. According to the fourth and fifth embodiments of the present invention, a fast and precise focal point adjusting operation is accomplished without lowering the throughput when pixel data relevant to a shot image is read.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2012-277813, filed Dec. 20, 2012, and No. 2013-111591, filed May 28, 2013, which are hereby incorporated by reference herein in their entirety.

What is claimed is:

1. An image pickup apparatus, comprising:
    a first imaging sensor comprising pixel portions arranged in a two-dimensional array, each of the pixel portions of the first imaging sensor comprising one micro lens corresponding to a plurality of photoelectric conversion portions, the first imaging sensor configured to be able to output parallax images;
    a second imaging sensor comprising pixel portions arranged in a two-dimensional array, each of the pixel portions of the second imaging sensor comprising one micro lens corresponding to a plurality of photoelectric conversion portions, the second imaging sensor configured to be able to output parallax images;
    a light beam splitting unit arranged to split a flux of light entering an optical system into first and second fluxes of light to be applied to the first imaging sensor and the second imaging sensor respectively;
    a first image processing unit configured to generate a still image for recording based on signals from the first imaging sensor; and
    a second image processing unit configured to generate a moving image for recording based on signals from the second imaging sensor;
    a calculation unit configured to, in a case where the first image processing unit generates the still image, perform focal point detection of a phase difference method based on the parallax images from the second imaging sensor, and to, while the second image processing unit generates the moving image, perform the focal point detection of the phase difference method based on the parallax images from the first imaging sensor.

2. An image pickup apparatus according to claim 1, wherein the first image processing unit and the second image processing unit are arranged to respectively process the signals from the pixel portions of the first imaging sensor and the signals from the pixel portions of the second imaging sensor independently of each other.

3. An image pickup apparatus according to claim 1, wherein the first imaging sensor, the second imaging sensor, and the light beam splitting unit are arranged so that images are formed in the first imaging sensor and the second imaging sensor by the optical system such that the optical system is used to form an image at both the first imaging sensor and the second imaging sensor.

4. An image pickup apparatus according to claim 1, wherein the second imaging sensor has fewer pixel portions than the first imaging sensor.

5. An image pickup apparatus according to claim 1, wherein focal point detection is performed using a contrast detection method comprising detecting a contrast from outputs of the pixel portions of the second imaging sensor.

6. An image pickup apparatus according to claim 1, wherein light transmitted through the light beam splitting unit enters the first imaging sensor, and wherein light reflected by the light beam splitting unit enters the second imaging sensor.

7. An image pickup apparatus according to claim 1, wherein light reflected by the light beam splitting unit enters the first imaging sensor, and wherein light transmitted through the light beam splitting unit enters the second imaging sensor.

8. An image pickup apparatus according to claim 1, wherein the light beam splitting unit is configured so that the split flux of light that enters the second imaging sensor is lower in intensity than the split flux of light that enters the first imaging sensor.

9. An image pickup apparatus according to claim 1, wherein the first imaging sensor is arranged to have a function of shooting a still image, and wherein the second imaging sensor is arranged to have a function of shooting a moving image.

10. An image pickup apparatus according to claim 1, wherein the first image processing unit uses signals generated by combining the signals from the first imaging sensor to generate the still image.

11. An image pickup apparatus, comprising:
    a first imaging sensor comprising pixel portions arranged in a two-dimensional array, each of the pixel portions of the first imaging sensor comprising one micro lens corresponding to a plurality of photoelectric conversion portions, the first imaging sensor configured to be able to output parallax images;
    a second imaging sensor comprising pixel portions arranged in a two-dimensional array, each of the pixel portions of the second imaging sensor comprising one micro lens corresponding to a plurality of photoelectric conversion portions, the second imaging sensor configured to be able to output parallax images;
    a beam splitter arranged to split a flux of light entering an optical system into first and second fluxes of light to be applied to the first imaging sensor and the second imaging sensor respectively;
    a first image processor configured to generate a still image for recording based on signals from the first imaging sensor; and
    a second image processor configured to generate a moving image for recording based on signals from the second imaging sensor;
    an AF calculator configured to, in a case where the first image processor generates the still image, perform focal point detection of a phase difference method based on the parallax images from the second imaging sensor, and to, while the second image processor generates the moving image, perform the focal point detection of the phase difference method based on the parallax images from the first imaging sensor.

12. An image pickup apparatus according to claim 11, wherein the first image processor and the second image processor are arranged to respectively process the signals from the pixel portions of the first imaging sensor and the signals from the pixel portions of the second imaging sensor independently of each other.

13. An image pickup apparatus according to claim 11, wherein the first imaging sensor, the second imaging sensor, and the beam splitter are arranged so that images are formed in the first imaging sensor and the second imaging sensor by the optical system such that the optical system is used to form an image at both the first imaging sensor and the second imaging sensor.

14. An image pickup apparatus according to claim 11, wherein the second imaging sensor has fewer pixel portions than the first imaging sensor.

15. An image pickup apparatus according to claim 11, wherein focal point detection is performed using a contrast detection method comprising detecting a contrast from outputs of the pixel portions of the second imaging sensor.

16. An image pickup apparatus according to claim 11,
wherein light transmitted through the beam splitter enters the first imaging sensor, and
wherein light reflected by the beam splitter enters the second imaging sensor.

17. An image pickup apparatus according to claim 11,
wherein light reflected by the beam splitter enters the first imaging sensor, and
wherein light transmitted through the beam splitter enters the second imaging sensor.

18. An image pickup apparatus according to claim 11, wherein the beam splitter is configured so that the split flux of light that enters the second imaging sensor is lower in intensity than the split flux of light that enters the first imaging sensor.

19. An image pickup apparatus according to claim 11,
wherein the first imaging sensor is arranged to have a function of shooting a still image, and
wherein the second imaging sensor is arranged to have a function of shooting a moving image.

20. An image pickup apparatus according to claim 11,
wherein the first image processor uses signals generated by combining the signals from the first imaging sensor to generate the still image.

* * * * *